(12) United States Patent
Mathur et al.

(10) Patent No.: US 11,868,281 B2
(45) Date of Patent: *Jan. 9, 2024

(54) ARTIFICIAL REALITY SYSTEM HAVING MULTI-BANK, MULTI-PORT DISTRIBUTED SHARED MEMORY

(71) Applicant: Meta Platforms Technologies, LLC, Menlo Park, CA (US)

(72) Inventors: Alok Kumar Mathur, Cupertino, CA (US); Ennio Salemi, Palo Alto, CA (US); Drew Eric Wingard, Palo Alto, CA (US); Valerio Catalano, San Francisco, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/818,196

(22) Filed: Aug. 8, 2022

(65) Prior Publication Data

US 2022/0391331 A1    Dec. 8, 2022

Related U.S. Application Data

(63) Continuation of application No. 16/720,635, filed on Dec. 19, 2019, now Pat. No. 11,409,671.

(Continued)

(51) Int. Cl.
*G06F 13/16* (2006.01)
*G06T 19/00* (2011.01)
(Continued)

(52) U.S. Cl.
CPC ..... *G06F 13/1626* (2013.01); *G02B 27/0172* (2013.01); *G06F 3/011* (2013.01);
(Continued)

(58) Field of Classification Search
None
See application file for complete search history.

(56) References Cited

U.S. PATENT DOCUMENTS

| 7,716,506 | B1 | 5/2010 | Surgutchik et al. |
| 10,241,941 | B2 | 3/2019 | Fader et al. |

(Continued)

FOREIGN PATENT DOCUMENTS

| CN | 107040446 A | 8/2017 |
| KR | 20090061253 A | 6/2009 |

OTHER PUBLICATIONS

"Allocate," Dictionary.com, 2022, 5 pages. URL:https://www.dictionary.com/browse/allocate.
(Continued)

*Primary Examiner* — Jwalant Amin
(74) *Attorney, Agent, or Firm* — Potomac Law Group, PLLC; Dannon G. Allbee

(57) ABSTRACT

This disclosure describes various examples of a system which uses a multi-bank, multi-port shared memory system that may be implemented as part of a system on a chip. The shared memory system may have particular applicability in the context of an artificial reality system, and may be designed to have distributed or varied latency for one or more memory banks and/or one or more components or subsystems within the system on a chip. The described shared memory system may be logically a single entity, but physically may have multiple memory banks, each accessible by any of a number of components or subsystems. In some examples, the memory system may enable concurrent, common, and/or shared access to memory without requiring, in some situations, full locking or arbitration.

19 Claims, 11 Drawing Sheets

Related U.S. Application Data

(60) Provisional application No. 62/902,783, filed on Sep. 19, 2019.

(51) Int. Cl.
*G02B 27/01* (2006.01)
*G06F 3/01* (2006.01)
*G06V 20/20* (2022.01)

(52) U.S. Cl.
CPC ........ *G06F 13/161* (2013.01); *G06F 13/1642* (2013.01); *G06T 19/006* (2013.01); *G06V 20/20* (2022.01)

(56) References Cited

U.S. PATENT DOCUMENTS

| | | | |
|---|---|---|---|
| 10,367,811 | B2 | 7/2019 | Clark et al. |
| 10,505,847 | B1 | 12/2019 | Singarayan et al. |
| 10,840,917 | B1 | 11/2020 | Cali et al. |
| 11,190,892 | B2 | 11/2021 | Mathur |
| 11,368,283 | B2 | 6/2022 | Satpathy et al. |
| 11,409,671 | B2 | 8/2022 | Mathur et al. |
| 11,474,970 | B2 | 10/2022 | Wang et al. |
| 11,520,707 | B2 | 12/2022 | Satpathy et al. |
| 2008/0276108 | A1 | 11/2008 | Surgutchik et al. |
| 2011/0087846 | A1 | 4/2011 | Wang et al. |
| 2011/0145777 | A1 | 6/2011 | Iyer et al. |
| 2013/0073886 | A1 | 3/2013 | Zaarur |
| 2014/0101354 | A1 | 4/2014 | Liu et al. |
| 2016/0378695 | A1 | 12/2016 | Fader et al. |
| 2017/0344296 | A1* | 11/2017 | Su ................. G06F 13/00 |
| 2017/0358141 | A1 | 12/2017 | Stafford et al. |
| 2017/0373839 | A1 | 12/2017 | Suresh et al. |
| 2021/0011556 | A1 | 1/2021 | Atlas et al. |
| 2021/0064113 | A1* | 3/2021 | Laurent ............... G11C 11/2253 |
| 2021/0149824 | A1 | 5/2021 | Satpathy et al. |
| 2021/0152673 | A1 | 5/2021 | Patil et al. |
| 2022/0086580 | A1 | 3/2022 | Mathur |
| 2023/0013500 | A1 | 1/2023 | Zong et al. |

OTHER PUBLICATIONS

Aoki K., et al., "Specification of Camellia—A 128-bit Block Cipher," Nippon Telegraph and Telephone Corporation and Mitsubishi Electric Corporation, Sep. 26, 2001, pp. 1-35.
Co-Pending U.S. Appl. No. 17/931,837, filed Dec. 24, 2019.
Czapski P., et al., "Power Optimization Techniques in FPGA Devices: A Combination of System- and Low-Levels," Jan. 2007, 8 pages. URL: https://www.researchgate.net/publication/288341764_Power_Optimization_Techniques_in_FPGA_Devices_A_Combination_of_System-_and_Low-Levels.
Diffie W., et al., "SMS4 Encryption Algorithm for Wireless Networks," International Association for Cryptologic Research, Version 1.03, May 15, 2008, 6 pages.
International Preliminary Report on Patentability for International Application No. PCT/US2020/047563, dated Mar. 31, 2022, 8 pages.
International Search Report and Written Opinion for International Application No. PCT/US2020/047563, dated Dec. 4, 2020, 10 Pages.
Jzbiciak., "Frequency vs. Power Consumption," Feb. 26, 2012, 3 pages. URL: https://lwn.net/Articles/483889/.
Kite T., "Understanding PDM Digital Audio," Audio Precision, Jan. 11, 2012, 9 pages.
Mcgrew D.A., et al., "The Galois/Counter Mode of Operation (GCM)," Conference Proceedings, 2005, 43 pages.
"Part 11: Wireless LAN Medium Access Control (MAC) and Physical Layer (PHY) Specifications—Amendment 3: Enhancements for Very High Throughput in the 60 GHz Band," IEEE Computer Society, LAN/MAN Standards Committee of the IEEE Computer Society, Dec. 28, 2012, 628 Pages.
Qiu M., et al., "Low-Power Low-Latency Data Allocation for Hybrid Scratch-Pad Memory," IEEE Embedded Systems Letters, IEEE, Dec. 2014, vol. 6 (4), pp. 69-72, XP011564944.
Waterman A., et al., "The RISC-V Instruction Set Manual, vol. II: Privileged Architecture," Privileged Architecture Version 1.10, Chapter 7, May 7, 2017, 13 pages.
Prosecution History of U.S. Appl. No. 16/720,635 dated Sep. 30, 2021 through Jun. 15, 2022, 101 pp.
Co-Pending U.S. Appl. No. 18/048,302, filed Oct. 20, 2022.
Prosecution History of U.S. Appl. No. 16/694,744 dated Jan. 30, 2020 through Sep. 8, 2022, 19 pp.
Non-Final Office Action dated Feb. 10, 2023 for U.S. Appl. No. 18/048,302, filed Oct. 20, 2022, 17 pages.
Notice of Allowance dated May 25, 2023 for U.S. Appl. No. 18/048,302, filed Oct. 20, 2022, 10 pages.
Response to Office Action dated May 10, 2023 for U.S. Appl. No. 18/048,302, filed Oct. 20, 2022, 7 pages.

* cited by examiner

ARTIFICIAL REALITY SYSTEM HAVING MULTI-BANK, MULTI-PORT DISTRIBUTED SHARED MEMORY

CROSS REFERENCE

This application is a continuation application of and claims priority to U.S. patent application Ser. No. 16/720,635 filed on Dec. 19, 2019, which claims the benefit of U.S. Provisional Patent Application No. 62/902,783 filed on Sep. 19, 2019. Both of these applications are hereby incorporated by reference herein in their entirety.

TECHNICAL FIELD

This disclosure generally relates to artificial reality systems, including memory systems for artificial reality systems, such as virtual reality, mixed reality and/or augmented reality systems

BACKGROUND

Artificial reality systems are becoming increasingly ubiquitous with applications in many fields such as computer gaming, health and safety, industrial, and education. For example, artificial reality systems are being incorporated into mobile devices, gaming consoles, personal computers, movie theaters, and theme parks. In general, artificial reality is a form of reality that has been adjusted in some manner before presentation to a user, which may include, e.g., a virtual reality, an augmented reality, a mixed reality, a hybrid reality, or some combination and/or derivatives thereof.

SUMMARY

This disclosure describes various examples of artificial reality systems implemented using one or more multi-bank, multi-port distributed shared memory systems. Such a shared memory system may be implemented as part of one or more integrated circuits and/or system on a chip (SoC) that has particular applicability in the context of an artificial reality system. In some examples, described shared memory systems may be viewed logically a single entity memory space, but physically may have multiple memory banks, each accessible by any of a number of components or subsystems, such as components or subsystems on an SoC. In some examples, the shared memory system may enable concurrent and low-latency access to multiple memory banks within the shared memory, while also enabling low-power consumption features. Such concurrent access may, in at least some cases, be performed without requiring full locking or arbitration. Such capabilities may be enabled, in part, through multiple switches or networks implemented on a SoC, through memory banks being logically or primarily associated with certain components or subsystems while still being accessible by all components or subsystems, through varied or distributed latency within the shared memory system, and/or by physically locating, on an integrated circuit, memory banks and other components with certain other components or subsystems. In some examples, associating certain memory banks with certain other components or subsystems may reduce the likelihood of concurrent access to the same memory bank, and as a result, reduce the need for locking or arbitration.

Further, this disclosure describes various examples of artificial reality SoCs designed by arranging memory banks and other components in a way that tends to limit path lengths from various artificial reality components of the SoC to particular memory banks within the shared memory. Such limited path lengths may help limit power consumption, and also may reduce memory latency. Further, in such an example, each of the memory banks may have latency that varies depending on the component or subsystem accessing a given memory bank. Such varied latency may provide opportunities for tuning performance of the SoC for particular applications.

The disclosed examples of shared memory and system on a chip may, in various implementations, have one or more technical advantages. For instance, and as further described herein, the described shared memory and SoC may enable concurrent and low-latency access to memory while also enabling low power consumption. Although described in reference to artificial reality systems, the techniques need not be limited to such applications.

In some examples, this disclosure describes operations performed by a shared memory system in accordance with one or more aspects of this disclosure. In one specific example, this disclosure describes an integrated circuit comprising: a shared memory including a plurality of memory banks including a first bank and a second bank; a plurality of subsystems, including a first subsystem and a second subsystem, wherein the first subsystem has access to the shared memory through a first port, wherein the second subsystem has access to the shared memory through a second port, and wherein access latency to the first bank by the first port is lower than access to the first bank by the second port; and a network connecting the first port and the second port to each of the plurality of memory banks, wherein the network: connects the first port to the first bank through a first switch, connects the second port to the second bank through a second switch, and enables concurrent access to the first bank by the first subsystem and the second bank by the second subsystem.

In another example, this disclosure describes a method comprising: receiving, by a computing system on an integrated circuit and from one of a plurality of subsystems on the integrated circuit, a request to allocate memory from a shared memory system, wherein the shared memory system is part of the integrated circuit and includes a plurality of banks arranged on the integrated circuit so that latency and power consumption attributes associated with accessing each of the plurality of banks differs for each of the plurality of subsystems; determining, by the computing system, which of the plurality of banks from which to allocate memory based on a cost assessment that includes information about expected memory access patterns of each of the plurality of subsystems, and further based on the latency and power consumption attributes associated with each of the plurality of banks; and allocating, by the computing system and responsive to determining, memory from one or more of the plurality of banks.

In another example, disclosure describes an integrated circuit that includes a network comprising a plurality of switches, wherein a switch included in the plurality of switches is configured to perform operations comprising: receiving, from one of a plurality of subsystems on the integrated circuit, a request to access memory from a requested bank included in a plurality of banks in a shared memory system, wherein the shared memory system is part of the integrated circuit wherein the plurality of banks are arranged on the integrated circuit so that latency and power consumption attributes associated with accessing each of the plurality of banks differs for each of the plurality of subsystems; determining whether the requested bank is directly accessible from the switch without accessing the requested bank through any other switch in the plurality of switches; accessing the requested bank without arbitration if the requested bank is directly accessible; and accessing the requested bank after performing arbitration if the requested bank is not directly accessible.

The details of one or more examples of the techniques of this disclosure are set forth in the accompanying drawings and the description below. Other features, objects, and advantages of the techniques will be apparent from the description and drawings, and from the claims.

DETAILED DESCRIPTION

Figure 1A:
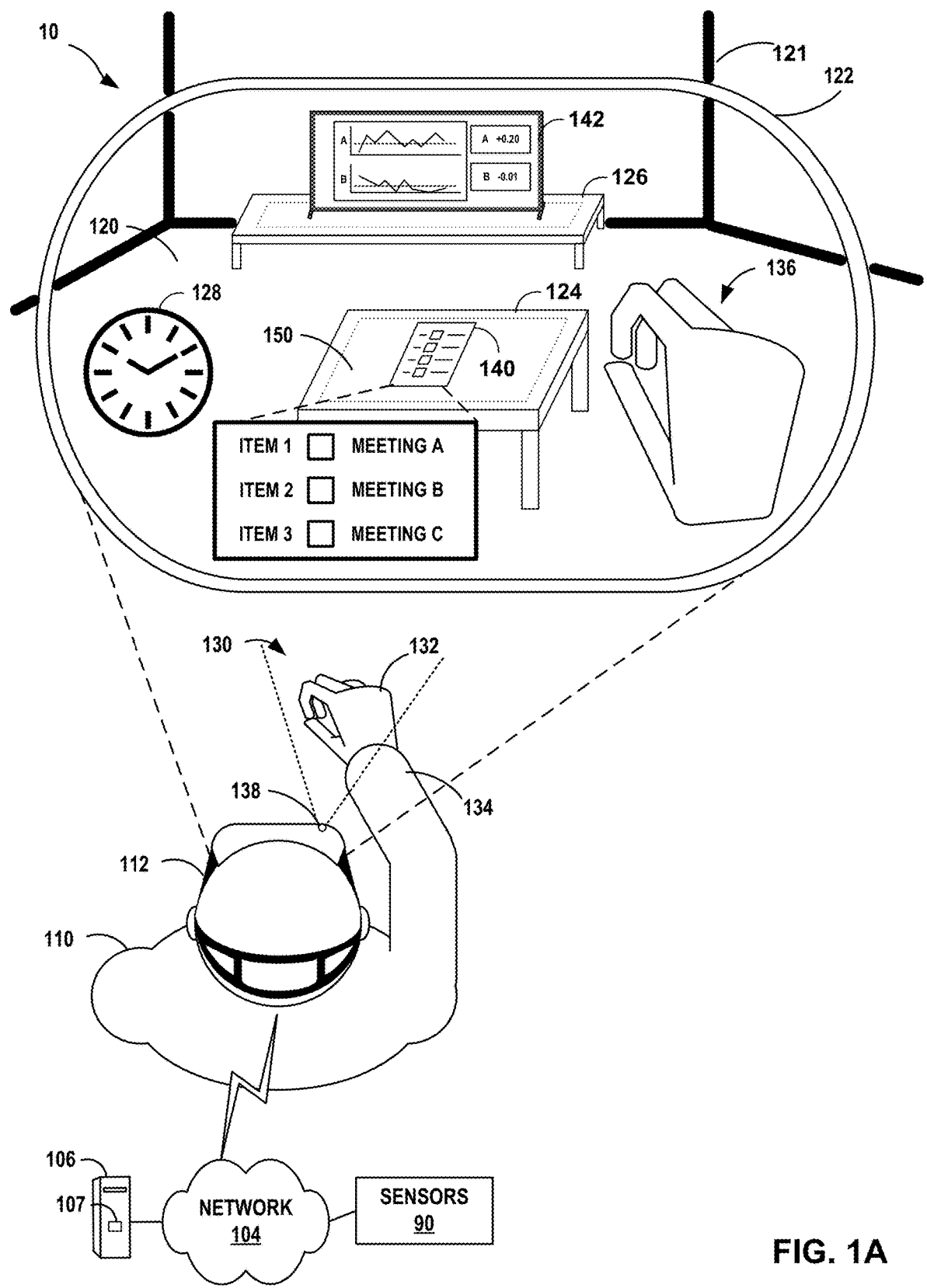
FIG. 1A is an illustration depicting an example artificial reality system in which one or more devices are implemented using one or more SoC integrated circuits within each device, in accordance with the techniques described in this disclosure.

FIG. 1A is an illustration depicting an example artificial reality system in which one or more devices are implemented using one or more SoC integrated circuits within each device, in accordance with the techniques described in this disclosure. In the example of FIG. 1A, artificial reality system 10 includes head mounted device (HMD) 112, console 106 and, in some examples, one or more external sensors 90.

As shown, HMD 112 is typically worn by user 110 and comprises an electronic display and optical assembly for presenting artificial reality content 122 to user 110. In addition, HMD 112 includes one or more sensors (e.g., accelerometers) for tracking motion of the HMD and may include one or more image capture devices 138, e.g., cameras, line scanners and the like, for capturing image data of the surrounding physical environment. Although illustrated as a head-mounted display, AR system 10 may alternatively, or additionally, include glasses or other display devices for presenting artificial reality content 122 to user 110.

In this example, console 106 is shown as a single computing device, such as a gaming console, workstation, a desktop computer, or a laptop. In other examples, console 106 may be distributed across a plurality of computing devices, such as a distributed computing network, a data center, or a cloud computing system. Console 106, HMD 112, and sensors 90 may, as shown in this example, be communicatively coupled via network 104, which may be a wired or wireless network, such as WiFi, a mesh network or a short-range wireless communication medium. Although HMD 112 is shown in this example as in communication with, e.g., tethered to or in wireless communication with, console 106, in some implementations HMD 112 operates as a stand-alone, mobile artificial reality system. In some examples, artificial reality system 10 includes a concurrent application engine 107 that is configured to concurrently execute multiple artificial reality applications that collaboratively build and share a common artificial reality environment.

In general, artificial reality system 10 uses information captured from a real-world, 3D physical environment to render artificial reality content 122 for display to user 110. In the example of FIG. 1A, user 110 views the artificial reality content 122 constructed and rendered by an artificial reality application executing on console 106 and/or HMD 112. In some examples, artificial reality content 122 may comprise a mixture of real-world imagery (e.g., hand 132, earth 120, wall 121) and virtual objects (e.g., virtual content items 124, 126, 140 and 142). In the example of FIG. 1A, artificial reality content 122 comprises virtual content items 124, 126 represent virtual tables and may be mapped (e.g., pinned, locked, placed) to a particular position within artificial reality content 122. Similarly, artificial reality content 122 comprises virtual content item 142 that represents a virtual display device that is also mapped to a particular position within artificial reality content 122. A position for a virtual content item may be fixed, as relative to a wall or the earth, for instance. A position for a virtual content item may be variable, as relative to a user, for instance. In some examples, the particular position of a virtual content item within artificial reality content 122 is associated with a position within the real-world, physical environment (e.g., on a surface of a physical object).

In the example artificial reality experience shown in FIG. 1A, virtual content items 124, 126 are mapped to positions on the earth 120 and/or wall 121. The artificial reality system 10 may render one or more virtual content items in response to a determination that at least a portion of the location of virtual content items is in the field of view 130 of user 110. That is, virtual content appears only within artificial reality content 122 and does not exist in the real world, physical environment.

During operation, an artificial reality application constructs artificial reality content 122 for display to user 110 by tracking and computing pose information for a frame of reference, typically a viewing perspective of HMD 112. Using HMD 112 as a frame of reference, and based on a current field of view 130 as determined by a current estimated pose of HMD 112, the artificial reality application renders 3D artificial reality content which, in some examples, may be overlaid, at least in part, upon the real-world, 3D physical environment of user 110. During this process, the artificial reality application uses sensed data received from HMD 112, such as movement information and user commands, and, in some examples, data from any external sensors 90, such as external cameras, to capture 3D information within the real world, physical environment, such as motion by user 110 and/or feature tracking information with respect to user 110. Based on the sensed data, the artificial reality application determines a current pose for the frame of reference of HMD 112 and, in accordance with the current pose, renders the artificial reality content 122.

Artificial reality system 10 may trigger generation and rendering of virtual content items based on a current field of view 130 of user 110, as may be determined by near or seemingly near real-time gaze tracking of the user, or other conditions. More specifically, image capture devices 138 of HMD 112 capture image data representative of objects in the real-world, physical environment that are within a field of view 130 of image capture devices 138. Field of view 130 typically corresponds with the viewing perspective of HMD 112. In some examples, the artificial reality application presents artificial reality content 122 comprising mixed reality and/or augmented reality. In some examples, the artificial reality application may render images of real-world objects, such as the portions of hand 132 and/or arm 134 of user 110, that are within field of view 130 along with the virtual objects, such as within artificial reality content 122. In other examples, the artificial reality application may render virtual representations of the portions of hand 132 and/or arm 134 of user 110 that are within field of view 130 (e.g., render real-world objects as virtual objects) within artificial reality content 122. In either example, user 110 is able to view the portions of their hand 132, arm 134, and/or any other real-world objects that are within field of view 130 within artificial reality content 122. In other examples, the artificial reality application might not render representations of the hand 132 or arm 134 of the user.

During operation, artificial reality system 10 performs object recognition within image data captured by image capture devices 138 of HMD 112 to identify hand 132, including optionally identifying individual fingers or the thumb, and/or all or portions of arm 134 of user 110. Further, artificial reality system 10 tracks the position, orientation, and configuration of hand 132 (optionally including particular digits of the hand), and/or portions of arm 134 over a sliding window of time.

In the example of FIG. 1A, artificial reality system 10 may detect one or more gestures intended to trigger a desired response by the artificial reality application, such as selecting and translating (e.g., moving) objects of the scene. In some examples, artificial reality system 10 may detect a series of gestures, such as a selection gesture (e.g., pinching) on agenda object 142, a translation gesture to move agenda object 142 out of offer area 150, and deselection gesture to release agenda object 142 in another location within the offer area or to another offer area within the artificial reality content. Once agenda object 142 is released in another location within the offer area or to another offer area, the shell processes the attachment to connect agenda object 142 to the offer area. In these examples, the shell of concurrent application engine 107 may receive dynamic updates to agenda object 140 (e.g., identified one or more gestures with agenda object 140) and renders the dynamic updates to agenda object 140 on the common scene.

In other examples, the shell may receive dynamic updates, such as network updates or sensor updates, for the artificial reality applications. As one example, the media content application (e.g., stock ticker) may receive periodic updates from the media content provider to be displayed on virtual display object 140. In this example, the shell of concurrent application engine 107 delivers input and other signals (e.g., stock ticker updates) for the media content application.

In some examples, console 106, HMD 112, and/or other components of system 10 of FIG. 1A may be implemented through one or more systems on a chip (SoCs). Such SoCs may use a multi-bank, multi-port distributed shared memory system as further described herein. In particular, a shared memory system may have particular applicability when implementing HMD 112 of FIG. 1A, since HMD 112 may operate in a manner that involves extensive of memory, yet use of external memory, particularly extensive use of external memory, may be expensive in terms of latency, concurrent access, and/or power consumption. Accordingly, aspects of HMD 112 may be implemented using SoCs that include a multi-bank, multi-port distributed latency shared memory system.

The system and techniques may provide one or more technical advantages that provide at least one practical application. For example, the disclosed shared memory systems and/or systems on a chip may, in various implementations, also have one or more technical advantages. For instance, as further described herein, a shared memory and SoC implemented in accordance with one or more aspects of the present disclosure may enable low-latency access to shared memory, concurrent access to shared memory, while also enabling low power consumption. In some cases, such concurrent access to shared memory may occur without requiring arbitration and/or contention or locking protocols. Such a shared memory system may also enable configurable and/or distributed latency, independent memory banks, and uniformly designed or fabricated memory banks. Such uniform design and/or fabrication may enable highly-tuned performance and/or high density implementation on an integrated circuit. In some examples, some aspects of each memory bank may also separately configurable. For example, each memory bank may include varied memory bank latency and separately-configurable memory bank low-power modes.

Figure 1B:
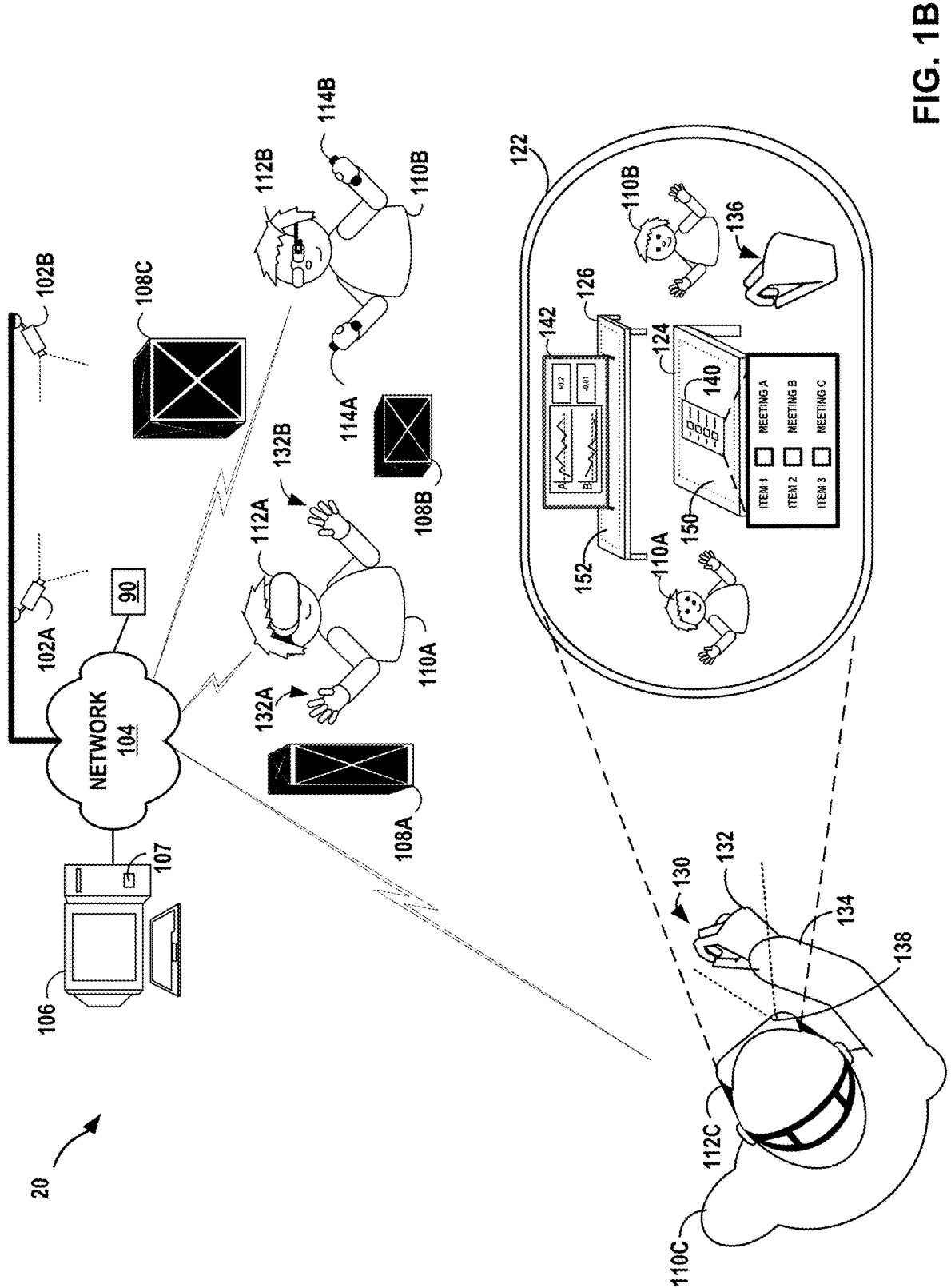
FIG. 1B is an illustration depicting another example artificial reality system in which one or more devices are implemented using one or more SoC integrated circuits within each device, in accordance with the techniques of the disclosure.

FIG. 1B is an illustration depicting another example artificial reality system in which one or more devices are implemented using one or more SoC integrated circuits within each device, in accordance with the techniques of the disclosure. Similar to artificial reality system 10 of FIG. 1A, in some examples, artificial reality system 20 of FIG. 1B may generate and render a common scene including objects for a plurality of artificial reality applications within a multi-user artificial reality environment. Artificial reality system 20 may also, in various examples, provide interactive placement and/or manipulation of virtual objects in response detection of one or more particular gestures of a user within the multi-user artificial reality environment.

In the example of FIG. 1B, artificial reality system 20 includes external cameras 102A and 102B (collectively, "external cameras 102"), HMDs 112A-112C (collectively, "HMDs 112"), controllers 114A and 114B (collectively, "controllers 114"), console 106, and sensors 90. As shown in FIG. 1B, artificial reality system 20 represents a multi-user environment in which a plurality of artificial reality applications executing on console 106 and/or HMDs 112 are concurrently running and displayed on a common rendered scene presented to each of users 110A-110C (collectively, "users 110") based on a current viewing perspective of a corresponding frame of reference for the respective user. That is, in this example, each of the plurality of artificial reality applications constructs artificial content by tracking and computing pose information for a frame of reference for each of HMDs 112. Artificial reality system 20 uses data received from cameras 102, HMDs 112, and controllers 114 to capture 3D information within the real world environment, such as motion by users 110 and/or tracking information with respect to users 110 and objects 108, for use in computing updated pose information for a corresponding frame of reference of HMDs 112. As one example, the plurality of artificial reality applications may render on the same scene, based on a current viewing perspective determined for HMD 112C, artificial reality content 122 having virtual objects 124, 126, 140, and 142 as spatially overlaid upon real world objects 108A-108C (collectively, "real world objects 108"). Further, from the perspective of HMD 112C, artificial reality system 20 renders avatars 122A, 122B based upon the estimated positions for users 110A, 110B, respectively.

Each of HMDs 112 concurrently operates within artificial reality system 20. In the example of FIG. 1B, each of users 110 may be a "participant" (or "player") in the plurality of artificial reality applications, and any of users 110 may be a "spectator" or "observer" in the plurality of artificial reality applications. HMD 112C may operate substantially similar to HMD 112 of FIG. 1A by tracking hand 132 and/or arm 134 of user 110C, and rendering the portions of hand 132 that are within field of view 130 as virtual hand 136 within artificial reality content 122. HMD 112B may receive user inputs from controllers 114A held by user 110B. HMD 112A may also operate substantially similar to HMD 112 of FIG. 1A and receive user inputs by tracking movements of hands 132A, 132B of user 110A. HMD 112B may receive user inputs from controllers 114 held by user 110B. Controllers 114 may be in communication with HMD 112B using near-field communication of short-range wireless communication such as Bluetooth, using wired communication links, or using another type of communication links.

In a manner similar to the examples discussed above with respect to FIG. 1A, console 106 and/or HMD 112C of artificial reality system 20 generates and renders a scene in which multiple artificial reality applications are concurrently running and displayed on the scene. In particular, concurrent application engine 107, executing on either HMD 112 or console 106, is configured to aggregate and render a scene in which an agenda application and media content application are concurrently running and displayed on artificial reality content 122. In this example, concurrent application engine 107 renders a common scene that includes an agenda object 140 of an agenda application and a virtual display object 142 of a media content application presented to each of users 110. In this way, user 110C may share content of concurrently running artificial reality applications, such as files or media content, with one or more of users 110A and 110B. When sharing content, each of HMDs 112 may output the content, when executed, so that each of users 110 may experience the content together, even if the HMDs are in geographically different locations.

As shown in FIG. 1B, in addition to or alternatively to image data captured via camera 138 of HMD 112C, input data from external cameras 102 may be used to track and detect particular motions, configurations, positions, and/or orientations of hands and arms of users 110, such as hand 132 of user 110C, including movements of individual and/or combinations of digits (fingers, thumb) of the hand.

In some aspects, the artificial reality application can run on console 106, and can utilize image capture devices 102A and 102B to analyze configurations, positions, and/or orientations of hand 132B to identify input gestures that may be performed by a user of HMD 112A. The concurrent application engine 107 may render virtual content items, responsive to such gestures, motions, and orientations, in a manner similar to that described above with respect to FIG. 1A. For example, concurrent application engine 107 may provide interactive placement and/or manipulation of agenda object 140 and/or virtual display object 142 responsive to such gestures, motions, and orientations, in a manner similar to that described above with respect to FIG. 1A.

Image capture devices 102 and 138 may capture images in the visible light spectrum, the infrared spectrum, or other spectrum. Image processing described herein for identifying objects, object poses, and gestures, for example, may include processing infrared images, visible light spectrum images, and so forth.

In some examples, console 106, HMD 112, and/or other components of system 10 of FIG. 1B may be implemented through one or more SoCs, as further described herein. For instance, in some examples, HMD 112 may include one or more SoCs that include a multi-bank, multi-port shared memory system as further described herein. Such a shared memory system may enable concurrent and low-latency access to shared memory, while also conserving power. In some examples, such a shared memory system may be implemented using a multi-port, multi-bank, distributed latency shared memory system tuned to expected data flows occurring within HMD 112.

Figure 2A:
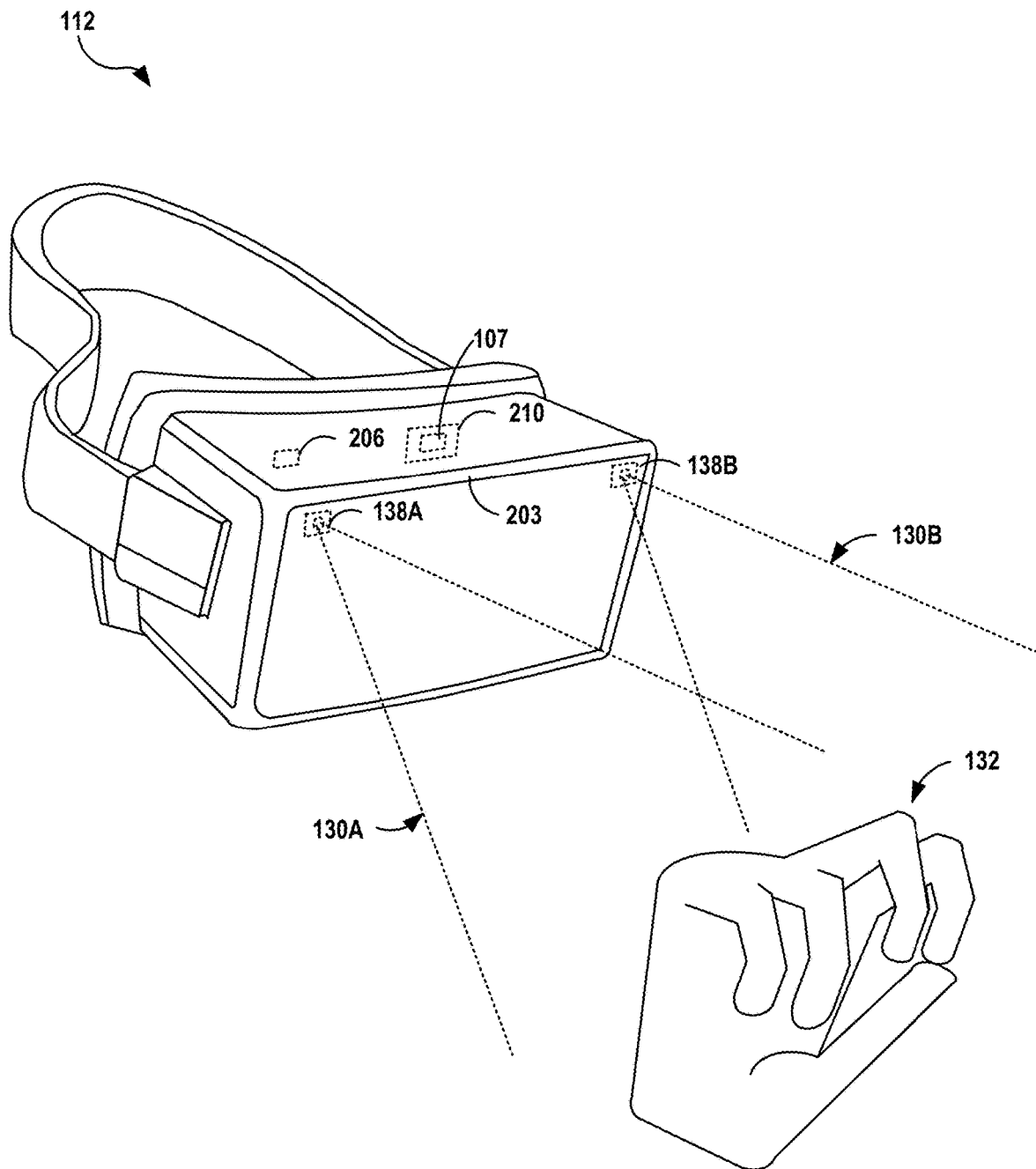
FIG. 2A is an illustration depicting an example HMD that operates in accordance with the techniques of the disclosure.

FIG. 2A is an illustration depicting an example HMD that operates in accordance with the techniques of the disclosure. HMD 112 of FIG. 2A may be an example of any of HMDs 112 of FIG. 1A and FIG. 1B. HMD 112 may be part of an artificial reality system, such as artificial reality systems 10, 20 of FIG. 1A or FIG. 1B, or may operate as a stand-alone, mobile artificial realty system configured to implement the techniques described herein.

In this example, HMD 112 includes a front rigid body and a band to secure HMD 112 to a user. In addition, HMD 112 includes an interior-facing electronic display 203 configured to present artificial reality content to the user. Electronic display 203 may be any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In some examples, the electronic display is a stereoscopic display for providing separate images to each eye of the user. In some examples, the known orientation and position of display 203 relative to the front rigid body of HMD 112 is used as a frame of reference, also referred to as a local origin, when tracking the position and orientation of HMD 112 for rendering artificial reality content according to a current viewing perspective of HMD 112 and the user. In other examples, HMD may take the form of other wearable head mounted displays, such as glasses or goggles.

As further shown in FIG. 2A, in this example, HMD 112 further includes one or more motion sensors 206, such as one or more accelerometers (also referred to as inertial measurement units or "IMUS") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. Moreover, HMD 112 may include integrated image capture devices 138A and 138B (collectively, "image capture devices 138"), such as video cameras, laser scanners, Doppler radar scanners, depth scanners, or the like, configured to output image data representative of the physical environment. More specifically, image capture devices 138 capture image data representative of objects (including hand 132) in the physical environment that are within a field of view 130A, 130B of image capture devices 138, which typically corresponds with the viewing perspective of HMD 112. HMD 112 includes an internal control unit 210, which may include an internal power source and one or more printed-circuit boards having one or more processors, memory, and hardware to provide an operating environment for executing programmable operations to process sensed data and present artificial reality content on display 203.

In one example, in accordance with the techniques described herein, control unit 210 is configured to, based on the sensed data (e.g., image data captured by image capture devices 138 and/or 102, position information from GPS sensors) and an aggregation of modeling information of virtual objects (e.g., virtual content items 124, 126, 140, 142 of FIG. 1A or FIG. 1B) of a plurality of artificial reality applications, generate and render for display on display 203 the objects of a plurality of concurrently executing artificial reality applications is simultaneously displayed on a common scene. As explained with reference to FIG. 1A and FIG. 1B, HMD 112 includes a concurrent application engine 107 configured to combine concurrently executing applications and displays them on a common rendered scene. In some examples, aspects of control unit 210 may be implemented through a multi-bank, multi-port distributed latency shared memory system, as further described herein.

In some examples, the concurrent application engine 107 controls interactions to the objects on the scene, and delivers input and other signals for interested artificial reality applications. For example, control unit 210 is configured to, based on the sensed data, identify a specific gesture or combination of gestures performed by the user and, in response, perform an action. As explained herein, control unit 210 may perform object recognition within image data captured by image capture devices 138 to identify a hand 132, fingers, thumb, arm or another part of the user, and track movements of the identified part to identify pre-defined gestures performed by the user. In response to identifying a pre-defined gesture, control unit 210 takes some action, such as generating and rendering artificial reality content that is interactively placed or manipulated for display on electronic display 203.

In accordance with the techniques described herein, HMD 112 may detect gestures of hand 132 and, based on the detected gestures, shift application content items placed on offer areas within the artificial reality content to another location within the offer area or to another offer area within the artificial reality content. For instance, image capture devices 138 may be configured to capture image data representative of a physical environment. Control unit 210 may output artificial reality content on electronic display 203. Control unit 210 may render a first offer area (e.g., offer area 150 of FIG. 1A and FIG. 1B) that includes an attachment that connects an object (e.g., agenda object 140 of FIGS. 1A and 1B). Control unit 210 may identify, from the image data, a selection gesture, where the selection gesture is a configuration of hand 132 that performs a pinching or grabbing motion to the object within offer area, and a subsequent translation gesture (e.g., moving) of hand 132 from the first offer area to a second offer area (e.g., offer area 152 of FIGS. 1A and 1B). In response to control unit 210 identifying the selection gesture and the translation gesture, control unit 210 may process the attachment to connect the object on the second offer area and render the object placed on the second offer area.

Figure 2B:
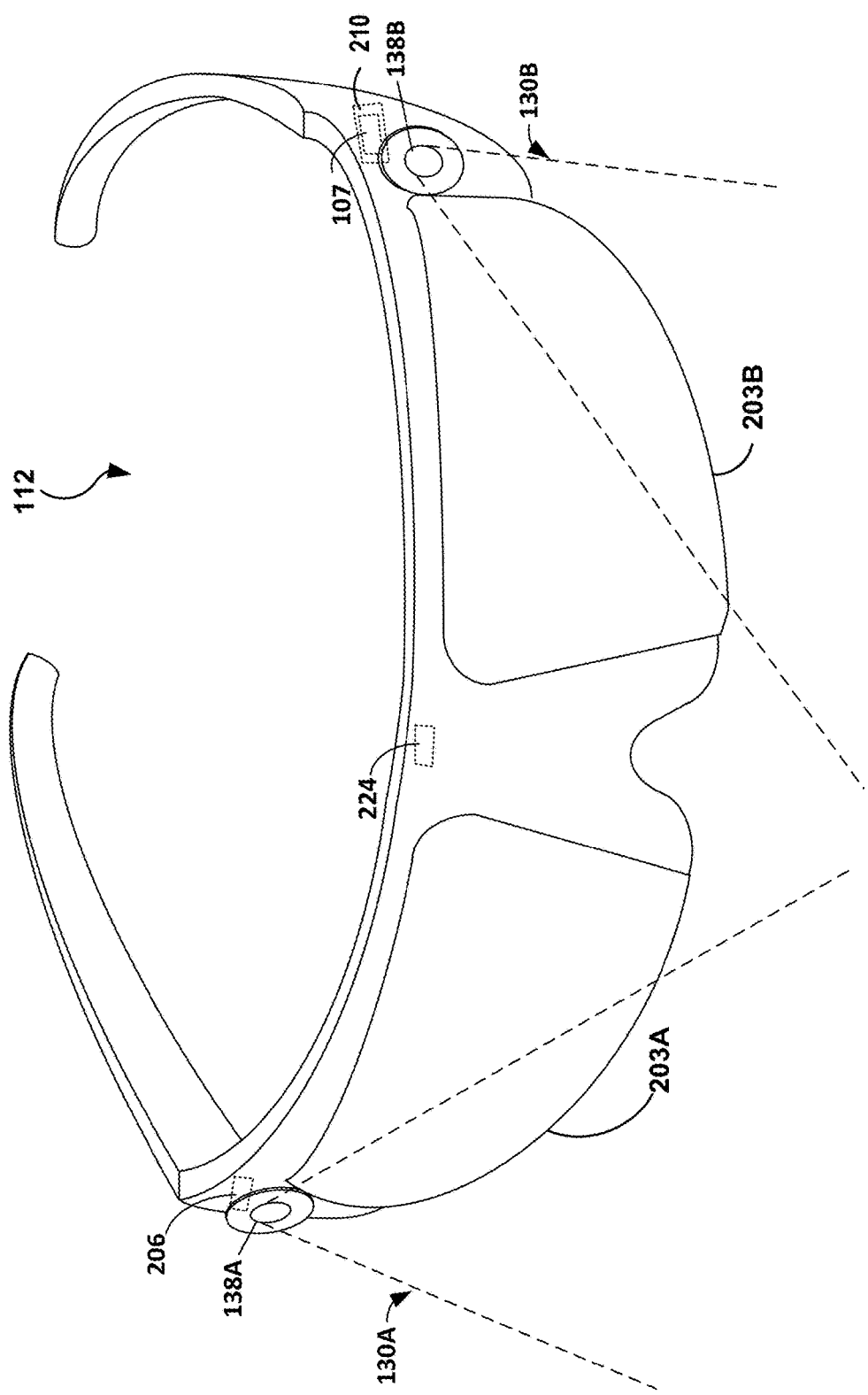
FIG. 2B is an illustration depicting another example HMD, in accordance with techniques described in this disclosure.

FIG. 2B is an illustration depicting another example HMD 112, in accordance with techniques described in this disclosure. As shown in FIG. 2B, HMD 112 may take the form of glasses. HMD 112 of FIG. 2A may be an example of any of HMDs 112 of FIGS. 1A and 1B. HMD 112 may be part of an artificial reality system, such as artificial reality systems 10, 20 of FIGS. 1A, 1B, or may operate as a stand-alone, mobile artificial realty system configured to implement the techniques described herein.

In this example, HMD 112 are glasses comprising a front frame including a bridge to allow the HMD 112 to rest on a user's nose and temples (or "arms") that extend over the user's ears to secure HMD 112 to the user. In addition, HMD 112 of FIG. 2B includes interior-facing electronic displays 203A and 203B (collectively, "electronic displays 203") configured to present artificial reality content to the user. Electronic displays 203 may be any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In the example shown in FIG. 2B, electronic displays 203 form a stereoscopic display for providing separate images to each eye of the user. In some examples, the known orientation and position of display 203 relative to the front frame of HMD 112 is used as a frame of reference, also referred to as a local origin, when tracking the position and orientation of HMD 112 for rendering artificial reality content according to a current viewing perspective of HMD 112 and the user.

As further shown in FIG. 2B, in this example, HMD 112 further includes one or more motion sensors 206, such as one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. Moreover, HMD 112 may include integrated image capture devices 138A and 138B (collectively, "image capture devices 138"), such as video cameras, laser scanners, Doppler radar scanners, depth scanners, or the like, configured to output image data representative of the physical environment. HMD 112 includes an internal control unit 210, which may include an internal power source and one or more printed-circuit boards having one or more processors, memory, and hardware to provide an operating environment for executing programmable operations to process sensed data and present artificial reality content on display 203. As in FIG. 2A, aspects of control unit 210 may be implemented through a multi-bank, multi-port distributed latency shared memory system.

Similar to the example illustrated in FIG. 2A, HMD 112 includes control unit 210 configured to, based on the sensed data (e.g., image data captured by image capture devices 138 and/or 102, position information from GPS sensors) and an aggregation of modeling information of virtual objects (e.g., virtual content items 124, 126, 140, 142 of FIGS. 1A and 1B) of a plurality of artificial reality applications, generate and render for display on display 203 the objects of a plurality of concurrently executing artificial reality applications. As explained with reference to FIGS. 1A and 1B, HMD 112 includes a concurrent application engine 107 configured to combine concurrently executing applications and displays them on a common rendered scene. In some examples, the concurrent application engine 107 controls interactions to the objects on the scene, and delivers input and other signals to and from interested artificial reality applications.

Figure 3:
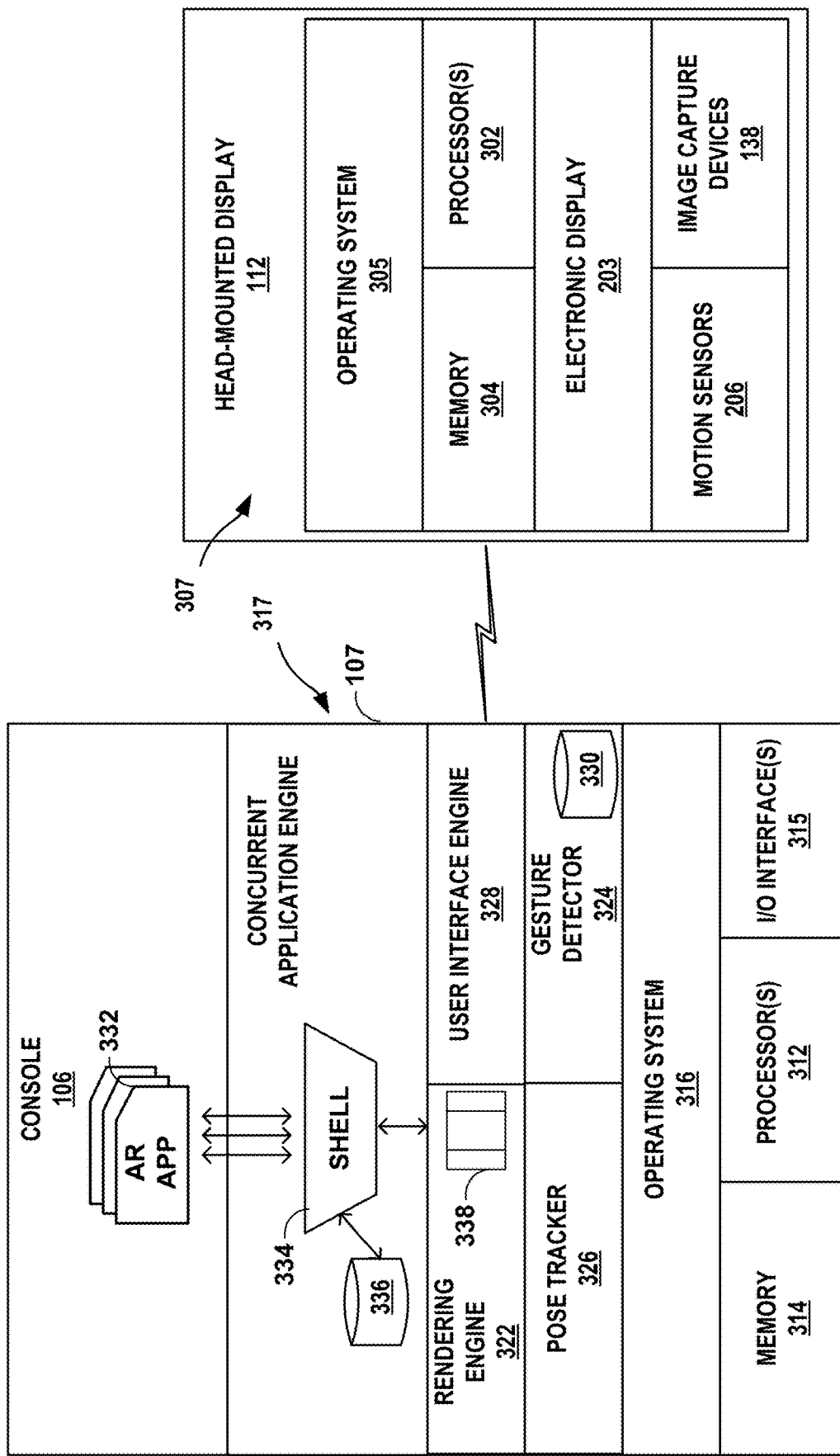
FIG. 3 is a block diagram showing example implementations of a console and an HMD of the artificial reality system that which may be implemented using one or more SoC integrated circuits, in accordance with the techniques of the disclosure.

FIG. 3 is a block diagram showing example implementations of a console and an HMD of the artificial reality system that which may be implemented using one or more SoC integrated circuits, in accordance with the techniques of the disclosure. In the example of FIG. 3, console 106 performs pose tracking, gesture detection, and generation and rendering of multiple artificial reality applications 322 concurrently running and outputting content for display within a common 3D AR scene on electronic display 203 of HMD 112.

In this example, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 307, including concurrent application engine 107. As discussed with respect to the examples of FIGS. 2A and 2B, processors 302 are coupled to electronic display 203, motion sensors 206 and image capture devices 138. In some examples, processors 302 and memory 304 may be separate, discrete components. In other examples, memory 304 may be on-chip memory collocated with processors 302 within a single integrated circuit. In such an example, memory 304 may include multi-bank, multi-port distributed latency shared memory, as further described herein, particularly with respect to FIG. 6 and FIG. 7.

In general, console 106 is a computing device that processes image and tracking information received from cameras 102 (FIG. 1B) and/or HMD 112 to perform gesture detection and user interface generation for HMD 112. In some examples, console 106 is a single computing device, such as a workstation, a desktop computer, a laptop, or gaming system. In some examples, at least a portion of console 106, such as processors 312 and/or memory 314, may be distributed across a cloud computing system, a data center, or across a network, such as the Internet, another public or private communications network, for instance, broadband, cellular, Wi-Fi, and/or other types of communication networks for transmitting data between computing systems, servers, and computing devices.

In the example of FIG. 3, console 106 includes one or more processors 312 and memory 314 that, in some examples, provide a computer platform for executing an operating system 316, which may be an embedded, real-time multitasking operating system, for instance, or other type of operating system. In turn, operating system 316 provides a multitasking operating environment for executing one or more software components 317. Processors 312 are coupled to one or more I/O interfaces 315, which provides one or more I/O interfaces for communicating with external devices, such as a keyboard, game controllers, display devices, image capture devices, HMDs, and the like. Moreover, the one or more I/O interfaces 315 may include one or more wired or wireless network interface controllers (NICs) for communicating with a network, such as network 104. Each of processors 302, 312 may comprise any one or more of a multi-core processor, a controller, a digital signal processor (DSP), an application specific integrated circuit (ASIC), a field-programmable gate array (FPGA), or equivalent discrete or integrated logic circuitry. Memory 304, 314 may comprise any form of memory for storing data and executable software instructions, such as random-access memory (RAM), read only memory (ROM), programmable read only memory (PROM), erasable programmable read only memory (EPROM), electronically erasable programmable read only memory (EEPROM), and flash memory.

Software applications 317 of console 106 operate to provide an aggregation of artificial reality applications on a common scene. In this example, software applications 317 include concurrent application engine 107, rendering engine 322, gesture detector 324, pose tracker 326, and user interface engine 328.

In general, concurrent application engine 107 includes functionality to provide and present an aggregation of content generated by a plurality of artificial reality applications 332, e.g., a teleconference application, a gaming application, a navigation application, an educational application, training or simulation applications, and the like. Concurrent application engine 107 may include, for example, one or more software packages, software libraries, hardware drivers, and/or Application Program Interfaces (APIs) for implementing an aggregation of a plurality of artificial reality applications 332 on console 106. As further described herein, concurrent application engine 107 presents a client interface that may, in one example, be a scene graph API by which each of artificial reality applications 332 register with shell 334 of the concurrent application engine 107 and communicate modeling information of objects of the artificial reality applications for rendering within common scene 338. For example, application developers may use a scene graph API to specify modeling information of objects (e.g., objects, properties of the objects, and relationships between objects) of artificial reality applications. Application developers may also use the scene graph API to specify offer areas (e.g., offer areas 150, 152 of FIGS. 1A, 1B) and requests for attachments to connect objects with the offer areas.

Based on the sensed data from any of the image capture devices 138 or 102, or other sensor devices, gesture detector 324 analyzes the tracked motions, configurations, positions, and/or orientations of HMD 112 and/or physical objects (e.g., hands, arms, wrists, fingers, palms, thumbs) of the user to identify one or more gestures performed by user 110. More specifically, gesture detector 324 analyzes objects recognized within image data captured by image capture devices 138 of HMD 112 and/or sensors 90 and external cameras 102 to identify a hand and/or arm of user 110, and track movements of the hand and/or arm relative to HMD 112 to identify gestures performed by user 110. Gesture detector 324 may track movement, including changes to position and orientation, of hand, digits, and/or arm based on the captured image data, and compare motion vectors of the objects to one or more entries in gesture library 330 to detect a gesture or combination of gestures performed by user 110.

Some entries in gesture library 330 may each define a gesture as a series or pattern of motion, such as a relative path or spatial translations and rotations of a user's hand, specific fingers, thumbs, wrists and/or arms. Some entries in gesture library 330 may each define a gesture as a configuration, position, and/or orientation of the user's hand and/or arms (or portions thereof) at a particular time, or over a period of time. Other examples of type of gestures are possible. In addition, each of the entries in gesture library 330 may specify, for the defined gesture or series of gestures, conditions that are required for the gesture or series of gestures to trigger an action, such as spatial relationships to a current field of view of HMD 112, spatial relationships to the particular region currently being observed by the user, as may be determined by real-time gaze tracking of the individual, types of artificial content being displayed, types of applications being executed, and the like.

Each of the entries in gesture library 330 further may specify, for each of the defined gestures or combinations/series of gestures, a desired response or action to be performed by software applications 317. For example, in accordance with the techniques of this disclosure, certain specialized gestures may be pre-defined such that, in response to detecting one of the pre-defined gestures, concurrent application engine 107 may control interactions to the objects on the rendered scene, and delivers input and other signals for interested artificial reality applications.

As an example, gesture library 330 may include entries that describe a selection gesture, a translation gesture (e.g., moving, rotating), modification/altering gesture (e.g., scaling), or other gestures that may be performed by users. Gesture detector 324 may process image data from image capture devices 138 to analyze configurations, positions, motions, and/or orientations of a user's hand to identify a gesture, such as a selection gesture. For instance, gesture detector 324 may detect a particular configuration of the hand that represents the selection of an object, the configuration being the hand being positioned to grab the object placed on a first offer area. This grabbing position could be, in some instances, a two-finger pinch where two or more fingers of a user's hand move closer to each other, performed in proximity to the object. Gesture detector 324 may subsequently detect a translation gesture, where the user's hand or arm moves from a first offer area to another location of the first offer area or to a second offer area. Gesture detector may also detect a releasing gesture, where two or more fingers of a user's hand move further from each other. Once the object is released to the second offer area, concurrent application engine 107 processes the attachment to connect the object to the second offer area.

Figure 4:
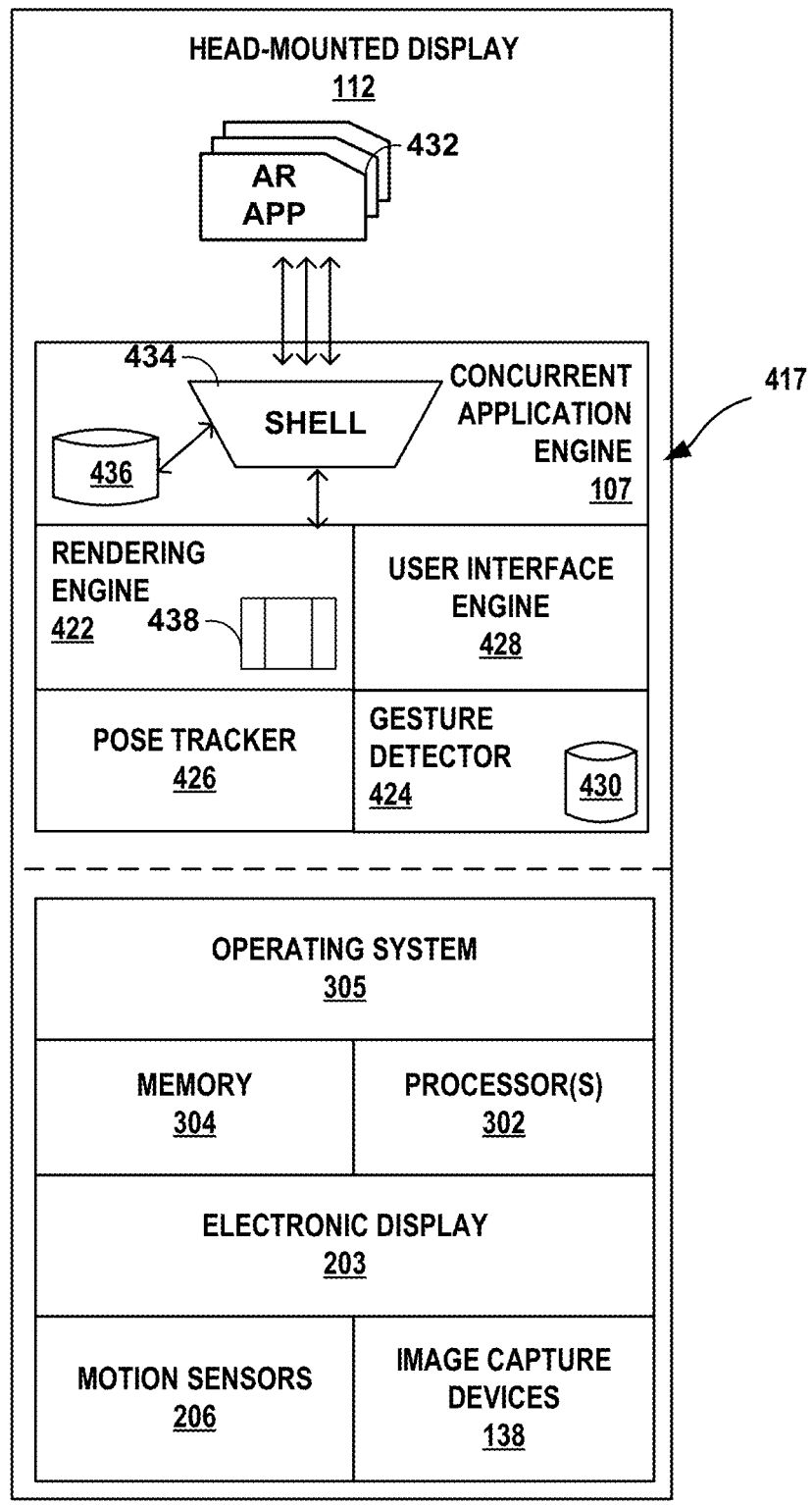
FIG. 4 is a block diagram depicting an example HMD of the artificial reality system which may be implemented using one or more SoC integrated circuits, in accordance with the techniques of the disclosure.

FIG. 4 is a block diagram depicting an example HMD of the artificial reality system which may be implemented using one or more SoC integrated circuits, in accordance with the techniques of the disclosure. In this example, similar to FIG. 3, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 417. Moreover, processor(s) 302 are coupled to electronic display 203, motion sensors 206, and image capture devices 138. In some examples, memory 304 may include multi-bank, multi-port distributed latency shared memory, as further described herein, particularly with respect to FIG. 6 and FIG. 7.

In the example of FIG. 4, software components 417 operate to generate and render multiple artificial reality applications concurrently running and outputting content for display within a common 3D AR scene. In this example, software applications 417 include concurrent application engine 107, rendering engine 422, gesture detector 424, pose tracker 426, and user interface engine 428. In various examples, software components 417 operate similar to the counterpart components of console 106 of FIG. 3 (e.g., concurrent application engine 107, rendering engine 322, gesture detector 324, pose tracker 326, and user interface engine 328) to aggregate and render a scene in which a plurality of artificial reality applications are concurrently running and displayed on the scene. In some examples, rendering engine 422 constructs the 3D, artificial reality content which may be overlaid, at least in part, upon the real-world, physical environment of user 110.

Figure 5:
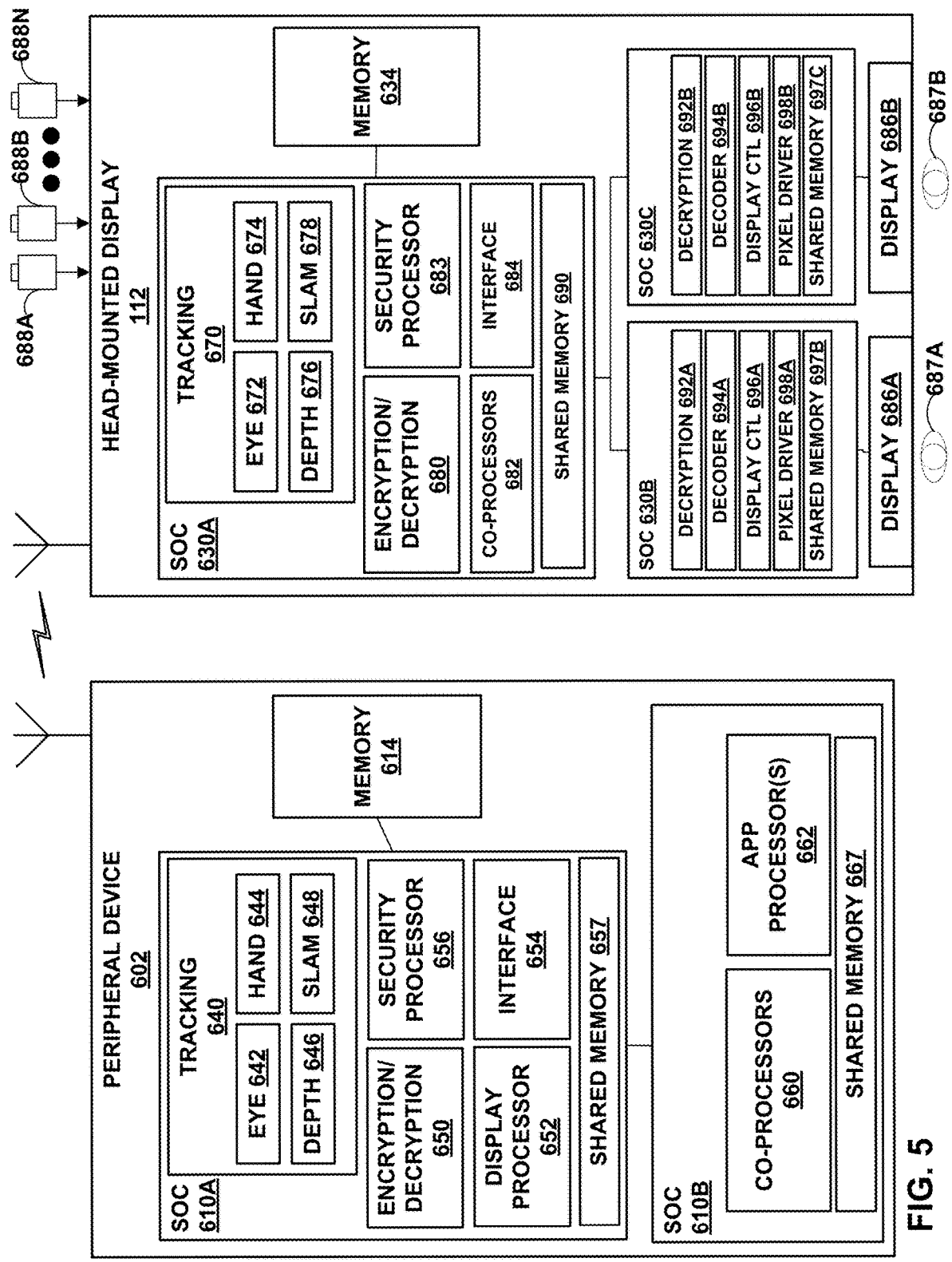
FIG. 5 is a block diagram illustrating a more detailed example implementation of a distributed architecture for a multi-device artificial reality system in which one or more devices are implemented using one or more SoC integrated circuits within each device, in accordance with the techniques described in this disclosure.

FIG. 5 is a block diagram illustrating a more detailed example implementation of a distributed architecture for a multi-device artificial reality system in which one or more devices are implemented using one or more SoC integrated circuits within each device, in accordance with the techniques described in this disclosure. In some examples, artificial reality system includes a peripheral device 602 operating in conjunction with HMD 112. In this example, peripheral device 602 is a physical, real-world device having a surface on which the AR system may overlay virtual content. Peripheral device 602 may include one or more presence-sensitive surfaces for detecting user inputs by detecting a presence of one or more objects (e.g., fingers, stylus) touching or hovering over locations of the presence-sensitive surface. In some examples, peripheral device 602 may include an output display, which may be a presence-sensitive display. In some examples, peripheral device 602 may be a smartphone, tablet computer, personal data assistant (PDA), or other hand-held device. In some examples, peripheral device 602 may be a smartwatch, smartring, or other wearable device. Peripheral device 602 may also be part of a kiosk or other stationary or mobile system. Peripheral device 602 might or might not include a display device for outputting content to a screen.

As described, HMD 112 is architected and configured to enable concurrent execution of multiple artificial reality applications and collaborative scene rendering in accordance with techniques described in this disclosure.

In general, the SoCs illustrated in FIG. 5 represent a collection of specialized integrated circuits arranged in a distributed architecture, where each SoC integrated circuit includes various specialized functional blocks, subsystems, and/or modules configured to provide an operating environment for artificial reality applications. FIG. 5 is merely one example arrangement of SoC integrated circuits. The distributed architecture for a multi-device artificial reality system may include any collection and/or arrangement of SoC integrated circuits.

In this example, SoC 630A of HMD 112 comprises functional blocks, subsystems, and/or modules including tracking block 670, an encryption/decryption block 680, co-processors 682, security processor 683, an interface block 684, and shared memory 690. Tracking block 670 provides functions for eye tracking 672 ("eye 672"), hand tracking 674 ("hand 674"), depth tracking 676 ("depth 676"), and/or Simultaneous Localization and Mapping (SLAM) 678 ("SLAM 678"). For example, HMD 112 may receive input from one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. HMD 112 may also receive image data from one or more image capture devices 688A-688N (collectively, "image capture devices 688"). Image capture devices may include video cameras, laser scanners, Doppler radar scanners, depth scanners, or the like, configured to output image data representative of the physical environment. More specifically, image capture devices capture image data representative of objects (including peripheral device 602 and/or hand) in the physical environment that are within a field of view of image capture devices, which typically corresponds with the viewing perspective of HMD 112. Based on the sensed data and/or image data, tracking 670 determines, for example, a current pose for the frame of reference of HMD 112 and, in accordance with the current pose, renders the artificial reality content.

Encryption/decryption block 680 provides functions to encrypt outgoing data communicated to peripheral device 602 or security server and decrypt incoming data communicated from peripheral device 602 or security server. Encryption/decryption block 680 may support symmetric key cryptography to encrypt/decrypt data with a session key (e.g., secret symmetric key).

Co-application processors or coprocessors 682 may include various processors such as a video processing unit, graphics processing unit, digital signal processors, encoders and/or decoders, and/or others. In accordance with the techniques described in this disclosure, all or portions of a backend shell may be in hardware, software, or a combination of hardware and software. For example, the backend shell of a concurrent application engine may be executed on co-application processors 682. A plurality of artificial reality applications may be concurrently executed on co-application processors 682.

Security processor 683 provides secure device attestation and mutual authentication of HMD 112 when pairing with devices, e.g., peripheral device 606, used in conjunction within the AR environment. Security processor 683 may authenticate SoCs 630A-630C of HMD 112.

Interface block 684 includes one or more interfaces for connecting to functional blocks, subsystems, and/or modules of SoC 630A. As one example, interface block 684 may include peripheral component interconnect express (PCIe) slots. SoC 630A may connect with SoC 630B, 630C using interface block 684. SoC 630A may connect with a communication device (e.g., radio transmitter) using interface block 684 for communicating with other devices, e.g., peripheral device 136.

Figure 6:
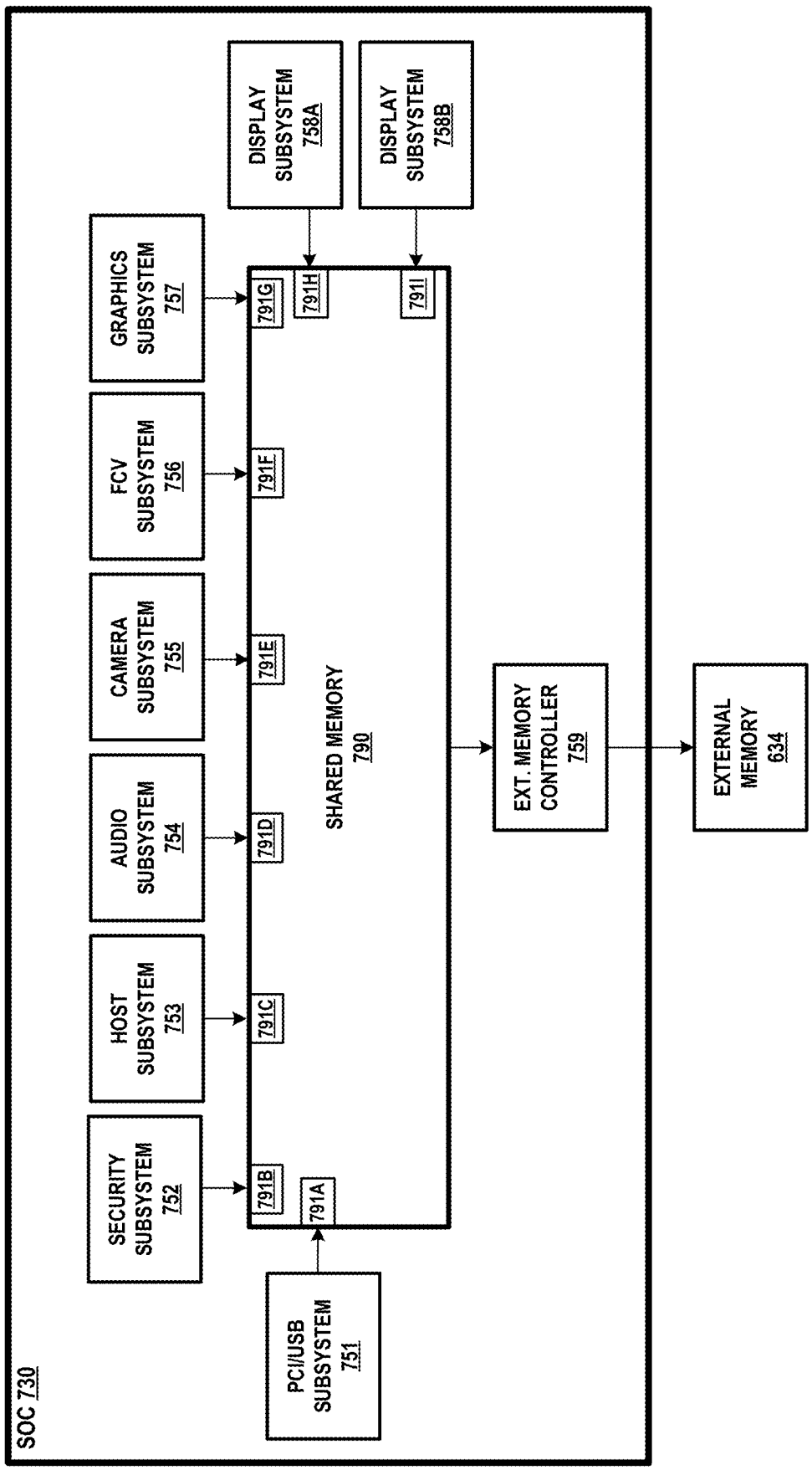
FIG. 6 is a block diagram illustrating an example SoC, which includes an example shared memory accessible by multiple components, subsystems, and/or devices included within the SoC in an artificial reality system, in accordance with one or more aspects of the present disclosure.
Figure 7:
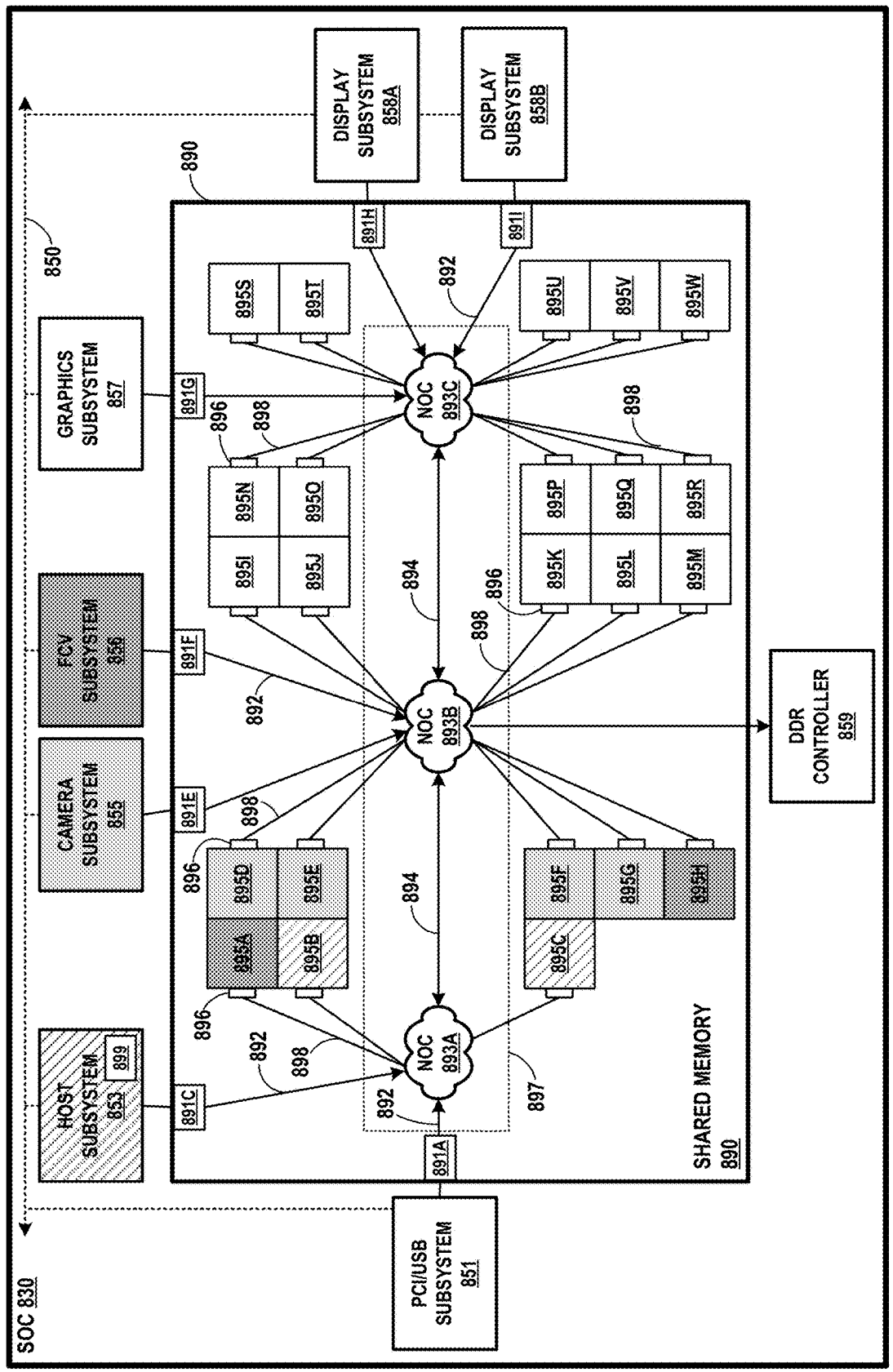
FIG. 7 is a block diagram illustrating an example SoC employing a shared memory system having multiple banks and multiple ports, in accordance with one or more aspects of the present disclosure.

Shared memory 690 may include or be implemented as a multi-bank, multi-port distributed latency shared memory system as further described herein, particularly with respect to FIG. 6 and FIG. 7. Such a shared memory system may enable concurrent and low-latency access to shared memory, while also conserving power. Further, such a shared memory system may be designed, implemented, and/or tuned to expected data flows occurring within HMD 112 or within or among subsystems of HMD 112.

SoCs 630B and 630C each represent display controllers for outputting artificial reality content on respective displays, e.g., displays 686A, 686B (collectively, "displays 686"). In this example, SoC 630B may include a display controller for display 668A to output artificial reality content for a left eye 687A of a user. For example, SoC 630B includes a decryption block 692A, decoder block 694A, display controller 696A, a pixel driver 698A for outputting artificial reality content on display 686A, and shared memory 697B. Similarly, SoC 630C may include a display controller for display 668B to output artificial reality content for a right eye 687B of the user. For example, SoC 630C includes decryption 692B, decoder 694B, display controller 696B, a pixel driver 698B for generating and outputting artificial reality content on display 686B, and shared memory 697C. Shared memory 697B and 697C, if included within one or more of SoCs 630B and 630C, may be designed and/or implemented in a manner similar to other shared memory described herein (e.g., shared memory 690), and may have attributes, functionality, and capabilities consistent with, similar to, or the same as such other shared memory systems described herein.

Displays 686 may include Light-Emitting Diode (LED) displays, Organic LEDs (OLEDs), Quantum dot LEDs (QLEDs), Electronic paper (E-ink) displays, Liquid Crystal Displays (LCDs), or other types of displays for displaying AR content.

Peripheral device 602 includes SoCs 610A and 610B configured to support an artificial reality application. In this example, SoC 610A comprises functional blocks, subsystems, and/or modules including tracking block 640, an encryption/decryption block 650, a display processor 652, an interface block 654, security processor 656, and shared memory 657. Tracking block 640 may be a functional block providing eye tracking 642 ("eye 642"), hand tracking 644 ("hand 644"), depth tracking 646 ("depth 646"), and/or Simultaneous Localization and Mapping (SLAM) 648 ("SLAM 648"). For example, peripheral device 602 may receive input from one or more accelerometers (also referred to as inertial measurement units or "IMUs") that output data indicative of current acceleration of peripheral device 602, GPS sensors that output data indicative of a location of peripheral device 602, radar or sonar that output data indicative of distances of peripheral device 602 from various objects, or other sensors that provide indications of a location or orientation of peripheral device 602 or other objects within a physical environment. Peripheral device 602 may in some examples also receive image data from one or more image capture devices, such as video cameras, laser scanners, Doppler radar scanners, depth scanners, or the like, configured to output image data representative of the physical environment. Based on the sensed data and/or image data, tracking block 640 determines, for example, a current pose for the frame of reference of peripheral device 602 and, in accordance with the current pose, renders the artificial reality content to HMD 112.

Encryption/decryption block 650 encrypts outgoing data communicated to HMD 112 or security server and decrypts incoming data communicated from HMD 112 or security server. Encryption/decryption block 650 may support symmetric key cryptography to encrypt/decrypt data using a session key (e.g., secret symmetric key).

Display processor 652 includes one or more processors such as a video processing unit, graphics processing unit, encoders and/or decoders, and/or others, for rendering artificial reality content to HMD 112.

Interface block 654 includes one or more interfaces for connecting to functional blocks of SoC 510A. As one example, interface block 684 may include peripheral component interconnect express (PCIe) slots. SoC 610A may connect with SoC 610B using interface block 684. SoC 610A may connect with one or more communication devices (e.g., radio transmitter) using interface block 684 for communicating with other devices, e.g., HMD 112.

Security processor 656 may provide secure device attestation and mutual authentication of peripheral device 602 when pairing with devices, e.g., HMD 112, used in conjunction within the AR environment. Security processor 656 may authenticate SoCs 610A, 610B of peripheral device 602.

Shared memory 657 may be implemented as a multi-bank, multi-port distributed latency shared memory system. Shared memory 657, if included within SoC 610A, may be designed and/or implemented in a manner similar to other shared memory described herein (e.g., shared memory 690), and may have attributes, functionality, and capabilities consistent with, similar to, or the same as such other shared memory systems described herein.

SoC 610B includes, in the example shown, co-application processors 660, application processors 662, and shared memory 667. In this example, co-application processors 660 includes various processors, such as a vision processing unit (VPU), a graphics processing unit (GPU), and/or central processing unit (CPU). Application processors 662 may include a processing unit for executing one or more artificial reality applications to generate and render, for example, a virtual user interface to a surface of peripheral device 602 and/or to detect gestures performed by a user with respect to peripheral device 602. Shared memory 667 may be implemented as a multi-bank, multi-port distributed latency shared memory system, and may have attributes, functionality, and capabilities consistent with, similar to, or the same as such other shared memory systems described herein.

In some examples, and as illustrated in FIG. 5, each of SoC 610A and SoC 601B may include shared memory 657 and shared memory 667, respectively. Each of shared memory 657 and 667 may be implemented as a multi-bank, multi-port distributed shared memory system as further described herein. Similarly, each of SoC 630A, 630B, and 630C may each include a shared memory (i.e., shared memory 697A, 697B, and 697C, respectively). In some examples, each of shared memory 697A, 697B, and 697C may be implemented as a multi-bank, multi-port distributed shared memory system as further described herein with respect to FIG. 6 and FIG. 7.

FIG. 6 is a block diagram illustrating an example SoC, which includes an example shared memory accessible by multiple components, subsystems, and/or devices included within the SoC in an artificial reality system, in accordance with one or more aspects of the present disclosure. SoC 730 of FIG. 6 may correspond to one or more of the SoCs of FIG. 5, such as SoC 630A of HMD 112. FIG. 6 illustrates shared memory 790 accessible by a number of subsystems or components, including PCI/USB subsystem 751, security subsystem 752, host subsystem 753, audio subsystem 754, camera subsystem 755, FCV subsystem 756, graphics subsystem 757, display subsystem 758A, and display subsystem 758B.

The example of FIG. 6 may be described in the context of an artificial reality system, such as that described in FIG. 1 through FIG. 5 of the present disclosure, but concepts described herein with regard to SoC 730 may apply in other contexts outside of artificial reality applications or implementations. In an example where SoC 730 in the example of FIG. 6 corresponds to SoC 630A, SoC 730 may be included within an HMD 112 and may perform functions relating to image capture, audio capture, eye, hand, and/or depth tracking, pose determination, input detection, encryption and/or description, and content generation and/or display. Moreover, although described in reference to an integrated circuit SoC, the techniques are architectures described herein are not limited to SoC implementations and one or more of the components of FIG. 6 may be implemented in one or more additional integrated circuits.

In the example of FIG. 6, each illustrated subsystem (e.g., any of PCI/USB subsystem 751 to external memory controller 759) may store data to shared memory 790 and retrieve data from shared memory 790, where shared memory 790 is internal to an integrated circuit implementing SOC 730 and serves as a multi-bank, multi-port distributed shared memory system. Shared memory 790 may, from the perspective of each subsystem, appear logically as a single entity or single memory device, yet may include multiple banks of memory (not shown in FIG. 6), each of which are internal to the SoC 730 integrated circuit and accessible by any of the subsystems.

In some implementations, each memory bank included in shared memory 790 (memory banks not specifically shown in FIG. 6) may be accessible by subsystems through ports or interfaces presented by shared memory 790 within the integrated circuit of SoC 730 for reading and writing data to/from shared memory 790 via an internal network included within shared memory 790. For instance, in the example of FIG. 6, PCI/USB subsystem 751 may access shared memory 790 through port 791A, which is an internal electrical connection within SoC 730. Similarly, security subsystem 752 may access shared memory 790 through port 791B, host subsystem 753 may access shared memory 790 through port 791C, audio subsystem 754 may access shared memory 790 through port 791D, camera subsystem 755 may access shared memory 790 through port 791E, FCV subsystem 756 may access shared memory 790 through port 791F, graphics subsystem 757 may access shared memory 790 through port 791G, display subsystem 758A may access shared memory 790 through port 791H, and display subsystem 758B may access shared memory 790 through port 791I.

In some examples, each port shown in FIG. 6 associated with a given subsystem may be dedicated to that subsystem, such that all accesses to memory by that subsystem occur through a single port. For instance, PCI/USB subsystem 751 may access any of the memory banks included within shared memory 790 through port 791A and may, in some examples, also access external memory 634 through port 791A. Correspondingly, security subsystem 752 may access any of the memory included within shared memory 790 through port 791B and may, in some examples, also access external memory 634 through port 791B.

The system of FIG. 6 may also include external memory controller 759 enabling access to additional memory, such as external memory 634 (e.g., external DDR memory), where external memory 634 is not located on SoC 730. In such an example, external memory 634 may appear to the subsystems within SoC 730 as just another large bank of memory, but with typically larger latency than for memory banks included within shared memory 790.

In some examples, multiple memory banks (or each memory bank) can be accessed through low-latency connections included within shared memory 790, and further, may be accessed simultaneously and/or concurrently by subsystems within SoC 730. Such capabilities may be enabled through a network included within shared memory 790 that enables certain subsystems to directly access specific memory banks within shared memory 790. Further, in some examples, such capabilities may be enabled through each memory bank within shared memory 790 being used primarily by one subsystem (or a subset of subsystems) to reduce the possibility of contention among multiple subsystems. These and other features of shared memory 790, as further described with respect to FIG. 7, may be provided while also achieving low power consumption attributes.

FIG. 7 is a block diagram illustrating an example SoC employing a shared memory system having multiple banks and multiple ports, in accordance with one or more aspects of the present disclosure. FIG. 7 illustrates SoC 830 including a number of blocks, subsystems, and/or modules, including PCI/USB subsystem 851, host subsystem 853, camera subsystem 855, FCV subsystem 856, graphics subsystem 857, display subsystem 858A, and display subsystem 858B. These subsystems access shared memory 890 through ports 891 as further described herein. Further, each of these subsystems may communicate over bus 850 for various purposes, including for allocating memory within shared memory 890. Host subsystem 853 may include memory management module 899. Shared memory 890 includes network 897 enabling access to each of a number of memory banks, labeled in FIG. 7 as memory bank 895A through memory bank 895W (collectively "memory banks 895").

Network 897 includes multiple switches 893A, 893B, and 893C (collectively "switches 893"), as well as connections 892, paths 894, and connections 898 connecting each of switches 893 to other components within shared memory 890. In some examples, each of switches 893 may be a network on a chip (NOC) that is capable of routing memory traffic within shared memory 890 along connections 892, paths 894, and/or connections 898. Accordingly, although described as switches, each of switches 893 may each serve as a network or NOC that includes connections between internal components and/or other attributes of a network. In some examples, aspects of each of switches 893 may serve as a crossbar switch, connecting one of multiple inputs to one of multiple outputs. Each of switches 893 may have capabilities for intelligently determining routes among components within network 897 and/or shared memory 890, and forwarding memory traffic within network 897 along one or more of connections 892, paths 894, and/or connections 898. In some examples, each of switches 893 may each operate on separate clock domains. In other examples, each of switches 893 may operate on a common clock, but in such an example, switches 893 may enable some tolerance to phase misalignment across memory banks 895.

In some examples, each of memory banks 895 may have the same design or a uniform design, potentially enabling economies of scale with regard to performance and density, and also with regard to latency and power consumption. For example, in some examples, a uniform design for each of multiple memory banks 895 that are each fabricated as part of an integrated circuit may provide opportunities to optimize the size of each of such memory banks 895, ultimately enabling more memory banks to be included in chip of a given size.

Each of memory banks 895 may be configured with power consumption features, such as the capability to automatically (or upon command) transition into a low-power or sleep mode. In some examples, each of memory banks 895 may operate independently within shared memory 890, and may be independently capable of determining when to transition into a low-power mode.

Although memory banks 895 are illustrated in FIG. 7 arranged in a specific manner, and although twenty-three memory banks 895 are shown, SoC 830 of FIG. 7 represents a specific example. In other examples, memory banks 895 may be arranged differently, and more or fewer memory banks 895 may be used in such other examples or implementations. In some examples, each of memory banks 895 may have a size on the order of one megabyte. In the specific example of SoC 830 of FIG. 7, therefore, shared memory 890 may have a capacity on the order of 23 megabytes. Memory of that size can be, in some cases, a relatively large amount of memory to implement on an integrated circuit. Accordingly, and as further described herein, SoC 830 may employ a number features to counter potentially negative effects of such a large amount of memory being integrated into an integrated circuit. Such features may serve to reduce memory latency, provide varied latency distribution, increase efficiency, enable low power consumption, and provide other technically advantageous attributes.

In the example of FIG. 7, each of the subsystems illustrated (e.g., PCI/USB subsystem 851, host subsystem 853, camera subsystem 855, FCV subsystem 856, graphics subsystem 857, and display subsystems 858) accesses memory banks 895 through one of ports 891. In some examples, each such port have be a dedicated port, such that all access to memory banks 895 within shared memory 890 for a given subsystem take place through that dedicated port. In particular, in the example of FIG. 7, PCI/USB subsystem 851 accesses memory banks 895 through port 891A, host subsystem 853 accesses memory banks 895 through port 891C, camera subsystem 855 accesses memory banks 895 through port 891E, FCV subsystem 856 accesses memory banks 895 through port 891F, graphics subsystem 857 accesses memory banks 895 through port 891G, display subsystem 858A accesses memory banks 895 through port 891H, and display subsystem 858B accesses memory banks 895 through port 891I.

In FIG. 7, each of ports 891 is illustrated as being connected to another switch 893 through one of connections 892. For example, port 891A is illustrated as being connected to switch 893A though connection 892. Similarly, port 891C is also illustrated as being connected to switch 893A through a different connection 892. In another example, port 891I is illustrated as being connected to switch 893C through another connection 892. For ease of illustration, not all connections between ports 891 and switches 893 are specifically labeled as connections 892.

Also in FIG. 7, each of switches 893 is illustrated as being connected to another one of switches 893 through one of paths 894. In particular, in 890, switch 893A is shown as connected to switch 893B through one of paths 894. Similarly, switch 893B is shown as connected to switch 893C through another one of paths 894. Although three switches 893 are illustrated in FIG. 7, more or fewer NOCs or switches may be used in other implementations or examples.

In FIG. 7, each of memory banks 895 has an interface 896, which may serve single entry point or as a target agent interface for communications and memory traffic associated with each of memory banks 895. Each of interfaces 896 associated with a respective memory bank 895 is connected to one of switches 893 over one of connections 898, where a given connection 898 for a given memory bank 895 serves as a path for memory access traffic for that memory bank 895. In the example of FIG. 7, for example, the interface 896 associated with memory bank 895A is shown connected to switch 893A through one of connections 898. Similarly, 896 associated with memory bank 895K is shown as connected to switch 893B through another one of connections 898. For ease of illustration in FIG. 7, not all connections between interfaces 896 and switches 893 are specifically labeled as connections 898.

Access to memory banks 895 by each of the subsystems of SoCs 830 may occur through network 897, which connects each subsystem's dedicated port 891 to each of memory banks 895. In the example of FIG. 7, and as previously described, network 897 made up of one or more switches 893, including switch 893A, switch 893B, and switch 893C (collectively "switches 893") and connections (892, 894, and 898) between ports 891, switches 893, and memory banks 895. Switches 893 may enable connections between multiple components within shared memory 890 while limiting the number of physical connections within shared memory 890. Appropriate use of multiple switches 893 may enable a reduction in the number of parallel connections and may enable multiple components within shared memory 890 to use the same connection for multiplexed traffic.

In some examples, each of switches 893 serves as a crossbar with multiple different arbiters. Each of the arbiters within one of switches 893 determines whether a memory operation involving one of memory banks 895 requires arbitration to be performed. In FIG. 7, for example, switch 893C may include 11 different arbiters, since switch 893C has 11 output ports. Of the 11 output ports, 10 lead to one of memory banks 895, and the other output port leads to switch 893B.

In FIG. 7, each of switches 893 may enable, in some cases, independent and concurrent access to multiple memory banks 895. For instance, and still with reference to switch 893C, if graphics subsystem 857 initiates an access to memory bank 895N, and display subsystem 858A also initiates an access to memory bank 895S, switch 893C may be capable of enabling each of memory banks 895N and 895S to be accessed by the requesting subsystems independently and concurrently. If switch 893C has such a capability, arbitration might not need to be performed for such memory accesses, and each of memory banks 895N and 895S may be accessed by the requesting subsystems independently and concurrently. However, in a different example, such as where graphics subsystem 857 and/or display subsystem 858A seeks to access one or more memory banks 895 that is not directly connected to switch 893C, the associated memory traffic will need to traverse connection 894 between switch 893C and switch 893B and be routed by switch 893B. In such an example, arbitration may be required to avoid contention with memory traffic originating from other subsystems or initiators.

In some examples, each of the subsystems in FIG. 7 (e.g., PCI/USB subsystem 851, host subsystem 853, camera subsystem 855, FCV subsystem 856, graphics subsystem 857, and display subsystems 858) may also access external memory through shared memory 890, such as through external memory controller 859. External memory controller 859 may correspond to external memory controller 759 of FIG. 6, and thus may access external memory 634 in a manner similar to that illustrated and described in connection with FIG. 6. In the example of FIG. 7, each subsystem may view external memory as a part of uniform memory, and another large bank of memory, although with longer latency. From a software perspective, external memory may still be uniform memory.

SoC 830 of FIG. 7 may be an alternative or example implementation of SoC 730 of FIG. 6. Similarly, SoC 830 of FIG. 7 may correspond to one or more of the SoCs of FIG. 5, such as SoC 630A of HMD 112. Accordingly, SoC 830 of FIG. 7 may be implemented in an artificial reality system, such as that described in connection with other figures in this disclosure. In such examples, SoC 830 may be implemented within HMD 112 and may perform functions to implement an overall artificial reality environment. However, concepts described herein with respect to SoC 830 may be applied to other contexts outside of artificial reality applications or implementations, and SoC 830 may therefore be advantageously deployed in other systems or for uses other than artificial reality contexts and applications.

SoC 830 of FIG. 7 may be particularly suited for a system, such as systems included within an HMD 112 in an artificial realty system, where extensive use of memory may be desired or required, but use of external memory may be expensive not only in terms of latency, but also in terms of power consumption. Therefore, shared memory 890 may be implemented as part of SoC 830, and may be designed and/or implemented in a manner that enables low-latency, concurrent access, and low-power features. For example, in FIG. 7, multiple switches 893 are used to route memory traffic among memory banks 895. Although a single switch or NOC could be used in some designs, such a switch or NOC could become a congestion point if the amount of memory traffic that the NOC routes is large. Further, a single switch or NOC might need to be large in size, and a large NOC tends to consume a significant amount of power. Accordingly, using multiple NOCs (e.g., switches 893) in the manner illustrated in FIG. 7 may be advantageous. For instance, using multiple switches 893 enables each of switches 893 to distribute memory traffic over multiple switches 893, which not only reduces congestion at any given switch 893, but also each of switches 893 in such a system tends to consume less power.

In some examples, from the perspective of subsystems and/or components within SoC 830 (but outside of shared memory 890), shared memory 890 appears to have multiple points of entry (e.g., ports 891). Each subsystem or functional block in shared memory 890 (e.g., PCI/USB subsystem 851, host subsystem 853, camera subsystem 855, FCV subsystem 856, graphics subsystem 857, and display subsystems 858) may generate traffic accessing one or more of memory banks 895 (e.g., accessing data or storing data). Each such subsystem, in the example of FIG. 7, has a port that it uses to initiate an access to one or more of memory banks 895. In some examples, when one or more of switches 893 receive memory traffic from a port, each such switch 893 may, in some cases, access a given memory bank 895 directly without having to arbitrate any other accesses to memory. Each of memory banks 895 may be considered independent, and in some cases, a particular switch 893 can access multiple directly-connected memory banks 895 without conflict.

Accordingly, in some examples, and as further described herein, access to multiple memory banks 895 may be concurrent without requiring memory traffic to traverse any common point. For example, PCI/USB subsystem 851 may access memory bank 895A by accessing shared memory 890 over port 891A, and where switch 893A routes memory traffic directly to memory bank 895A. Similarly, display subsystem 858B may access memory bank 895N by accessing shared memory 890 over port 891I, and where switch 893C routes memory traffic directly to memory bank 895N. In such an example, the memory traffic to each of memory banks 895A and memory bank 895N need not traverse any common point, so memory bank 895A and memory bank 895N can be accessed concurrently by PCI/USB subsystem 851 and display subsystem 858B. Further, each of switches 893 may be designed so that it is capable of enabling multiple subsystems to access multiple directly-connected memory banks 895 concurrently (e.g., enabling PCI/USB subsystem 851 to access memory bank 895A while host subsystem 853 accesses memory bank 895B). Concurrent access may, in turn, provide significant bandwidth enhancements, and this is one advantage over a system in which shared access to memory is performed using a single NOC. For instance, if four memory banks 895 are accessed simultaneously by four different subsystems, effective memory speed or bandwidth of shared memory 890 may be on the order of four times faster than the access speed of a single memory bank 895.

In general, such concurrent access may be possible in SoC 830 where subsystems are accessing one or more memory banks 895 that are physically close to that subsystem on the SoC 830 and/or where only a single hop involving one switch 893 is required. However, where a subsystem is accessing one or more memory banks 895 that are not physically close to that subsystem on SoC 830 and/or where multiple hops involving multiple switches 893 are required, arbitration may be required to avoid memory traffic contention. In such a case, concurrent access to multiple memory banks 895 may be limited or possible only after arbitration. However, if SoC 830 is designed so that each of the subsystems within SoC 830 and memory banks 895 are physically arranged on SoC 830 in a way that tends to minimize the number of switches 893 that need to be traversed and physical distances between memory typically or commonly accessed by a given subsystem, memory traffic arbitration can be avoided to a significant extent. If memory traffic arbitration can be avoided, concurrent memory access may be enabled in many cases.

One way to enable shared memory 890 to provide concurrent access to shared memory banks 895 without, in many cases, doing arbitration of memory traffic, is to implement shared memory 890 using a distributed latency design, where the latency of access to memory banks 895 tends to vary depending on which of ports 891 (or subsystems) is accessing which of memory banks 895. In such an example, latency from port 891A to memory bank 895A may be less than the latency from port 891H to memory bank 895A. Such latency to memory bank 895A may be reduced for port 891A because only a single hop (involving switch 893A) is required for port 891A to reach memory bank 895A. In FIG. 7, latency may be a function of the number of hops required to reach a target memory bank 895.

In some examples, the physical lengths of connections 892, paths 894, and connections 898 may also have an impact on the latency between a given port 891 and a given memory bank 895 because there is often an electrical limit to the distance such connections or paths can extend on an integrated circuit. Where the connections or paths are too long, it might be necessary to reamplify signals in order for the signal to be stable when it reaches its destination along a connection or a path. In such a case, such reamplification might require an additional clock cycle, thereby increasing latency. Therefore, latency to from port 891A to memory bank 895A may also be reduced because the physical distance from port 891A to memory bank 895A (the lengths of connections 892 and connections 898) may be relatively short compared to the physical distance from port 891H to memory bank 895A (the lengths of corresponding connections 892 from port 891H, paths 894 and connection 898). These differences in physical lengths of connections are apparent from FIG. 7 for a design where the lengths of connections illustrated in FIG. 7 are approximately drawn to scale.

Such a distributed latency design also has power consumption advantages. For instance, SoC 830 may conserve power by limiting the number of hops traversed by traffic to memory banks 895, by limiting the length of the connections traveled by common or typical memory traffic to memory banks 895, and by limiting the length of connections, wires, and/or paths within SoC 830. Multiple NOCs or switches 893, rather than a single NOC (or switch), also tends to be more power-efficient, since implementing a shared memory using a single NOC may require that the single NOC consume a large amount of power. As a result of design considerations that enable a distribute latency design, power consumption attributes of SoC 830 can thereby be improved.

In some examples, each of memory banks 895 may also be configured with additional power consumption features, such as the capability to automatically (or upon command) transition into a low-power or sleep mode. In some examples, each of memory banks 895 operate independently on SoC 830, and are independently capable of determining when to transition into a low-power mode. In some examples, each of memory banks 895 may determine whether to transition into a sleep mode or low-power mode based on how much time has passed since a prior access to that memory banks 895, and/or based on access patterns of subsystems that tend to access a given memory bank 895. It may be possible, after SoC 830 is deployed, to adjust or tune how often memory banks 895 transition into low-power mode by evaluating such access patterns and/or usage patterns of shared memory 890, and learning appropriate or optimal thresholds for making such transitions. In some examples, there may also be a cost in terms of latency and power consumption to transition memory banks 895 out of low-power mode, and such cost may affect how often memory banks 895 transition into low-power mode. In addition, such mode transition costs may be considered, in some examples, when memory management module 899 is performing a cost evaluation or evaluating a cost function when allocating memory within memory banks 895, as further described below.

SoC 830 may also be designed by tuning latency based on expected usage patterns of each such subsystem. For instance, in some systems, such as in an artificial reality system as illustrated in FIG. 1 through FIG. 5, it may be possible to know at design time how data is expected to flow within SoC 830. It may also be possible to know information about the memory requirements of each of the subsystems implemented within SoC 830 (e.g., PCI/USB subsystem 851, host subsystem 853, camera subsystem 855, FCV subsystem 856, graphics subsystem 857, and display subsystems 858). By taking advantage of such knowledge, it may be possible to make design choices that tend to reduce the latency of common memory operations, enable concurrent memory operations, and reduce the overall power consumption needs of SoC 830. Such design choices may involve choosing the number and physical arrangement of memory banks 895, the number and physical arrangement of ports 891, the number and physical arrangement of switches 893, and in general the topology of the network made up of switches 893 and connections 892, paths 894, and connections 898. For a general purpose SoC, where the expected use cases are not known at design time, such design choices might not be possible or advisable. However, where significant information about expected use cases is known at design time, design choices can be made that have a significant impact on memory latency and power efficiency. Such design choices may also be made late in the design, enabling customizations pertinent to and taking advantage of expected usage patterns to be deployed just prior to fabricating an integrated circuit corresponding to SoC 830.

Accordingly, one or more memory banks 895 can be arranged on SoC 830 in such a way to enable efficient access by particular subsystems. For instance, in the example of FIG. 7, there may be expected usage patterns that suggest that data coming from host subsystem 853 is likely only going to memory bank 895B and/or memory bank 895C. In such an example, each of memory bank 895B, memory bank 895C, switch 893A, port 891C, and host subsystem 853 may be physically arranged on SoC 830 so that connections between such components are short and require only a single hop (switch 893A). Although host subsystem 853 is able to access any of memory banks 895 through port 891C, and shared memory 890 may logically still appear to be a single uniform memory space, host subsystem 853 may be unlikely to access any memory banks 895 other than memory bank 895B and memory bank 895C. Accordingly, it may be appropriate to make design choices that improve and/or optimize the ability of host subsystem 853 to access memory bank 895B and memory bank 895C.

Similarly, camera subsystem 855 may also be expected (based on knowledge of the ultimate application of SoC 830) to primarily access memory banks 895D, 895E, 895F, and 895G. Therefore, each of those memory banks as well as switch 893B, port 891E, and memory bank 8955 may be physically arranged on SoC 830 so that connection between those components are short and require only a single hop (switch 893B).

As another example, FCV subsystem 856 may also be expected to primarily access memory bank 895H and memory bank 895A. Accordingly, during the design process, an effort may be made to arrange memory bank 895A, memory bank 895H, switch 893B, port 891F, and FCV subsystem 856 arranged so that the corresponding components are short and require only a single hop. In some examples, however, it might not always be possible or efficient to design SoC 830 to achieve all such design optimizations. For instance, in the example of FIG. 7, design considerations may result in FCV subsystem 856 being required to access FCV subsystem 856A through two hops, even though FCV subsystem 856 is expected to access FCV subsystem 856A frequently. However, in an example where FCV subsystem 856 tends to be relatively tolerant of latency, the arrangement of FIG. 7 might be an appropriate design, even if FCV subsystem 856 does not have a direct, one-hop path to memory bank 895A. If increased latency for FCV subsystem 856 is less likely to affect performance, it may be appropriate to position one or more memory banks 895 in non-optimal locations on SoC 830 relative to FCV subsystem 856.

Accordingly, in the example of FIG. 7, when FCV subsystem 856 seeks to access memory bank 895A, FCV subsystem 856 initiates a memory access over port 891F, and that access is communicated to switch 893B over connection 892 between port 891F and switch 893B. Switch 893B, or an agent associated with switch 893B, generates a route to memory bank 895A. Based on the generated route, switch 893B routes the memory traffic to switch 893A over path 894 between switch 893B and switch 893A. Switch 893A receives the memory traffic and routes the traffic to memory bank 895A over connection 898 between switch 893A and memory bank 895A.

In addition, other design considerations may result from knowledge about how certain subsets of subsystems may process or access some of the same data. In such an example, such subsystems may have a need to access one or more common memory banks 895. It may be appropriate, therefore, that such subsystems be colocated on SoC 830 so that they are physically near each other. In addition, such subsystems may be physically arranged on SoC 830 so that each can quickly and efficiently (e.g., low latency, low power, single-hop) access those common memory banks 895 through the ports 891 associated with those subsystems.

Other design considerations may relate to access to external memory. For instance, in some examples, some subsystems may have a tendency to require access to external memory through external memory controller 859. Camera subsystem 855, FCV subsystem 856, and/or graphics subsystem 857 may, in some examples, access external memory more often than other subsystems, so SoC 830 may be designed to enable one or more of those subsystems to more efficiently access external memory through external memory controller 859. Such a design may enable camera subsystem 855, FCV subsystem 856, and/or graphics subsystem 857 to reach external memory controller 859 through only a single switch 893 hop and/or enable such subsystems to reach external memory controller 859 over physically short connections.

In some examples, memory allocation within shared memory 890 may be performed by a memory manager module executing on one or more of the subsystems within SoC 830. In one such example, memory management module 899, executing on one or more cores of host subsystem 853, may allocate memory for host subsystem 853 and for each of the other subsystems. In some examples, memory management module 899 may have a global view of shared memory 890, such that memory management module 899 has information indicating which of memory banks 895 are directly accessible (e.g., one hop) to various subsystems, and which of memory banks 895 are accessible to ports 891 within shared memory 890 over relatively short paths. Memory management module 899 may also have access to information about memory usage patterns of each of the subsystems within SoC 830, interactions between various subsystems relating to how memory is use, and other information about data flows within shared memory 890. Memory management module 899 may use such information to allocate memory in a manner that reduces the latency of common memory operations, enables concurrent memory operations, and reduces the overall power consumption needs of SoC 830.

In accordance with one or more aspects of the present disclosure, host subsystem 853 may allocate memory for one or more of subsystems (e.g., PCI/USB subsystem 851, host subsystem 853, camera subsystem 855, FCV subsystem 856, graphics subsystem 857, and display subsystems 858) within SoC 830. For instance, in an example that can be described in the context of FIG. 7, one of the subsystems within SoC 830, such as camera subsystem 855, outputs a signal over bus 850. Host subsystem 853 detects a signal and outputs information about the signal to memory management module 899. Memory management module 899 determines that the signal corresponds to a request, by camera subsystem 855, to allocate memory. Memory management module 899 determines, based on information about shared memory 890, which of memory banks 895 from which to allocate memory. In one example, memory management module 899 may allocates memory from one or more of memory banks 895D, 895E, 895F, and/or 853G. Such an allocation may be preferred, since those memory banks are accessible directly through switch 893B, and may, in some cases, be accessed with little or no arbitration. Further, memory banks 895D, 895E, 895F, and/or 853G may be physically closer to camera subsystem 855 and/or port 891E, thereby tending to limit power consumption for accesses to such memory by camera subsystem 855, and also tending to limit any signal amplification that might otherwise need to be performed for signals propagating between camera subsystem 855 and memory banks 895.

In some examples, to determine from which memory banks 895 to allocate memory, memory management module 899 may perform a cost assessment or evaluate a cost function to determine which of memory banks 895 represents the least-cost choice for allocating memory. Such a cost function may evaluate factors including information about expected memory access patterns of each of the plurality of subsystems, physical distances between components of SoC 830, topology of the network within shared memory 890, and power consumption attributes associated with each of memory banks 895. Such a cost function may also assign weights to each such factor based on the relative impact such factors have on reducing the latency of common memory operations, enabling concurrent memory operations, and reducing the overall power consumption needs of SoC 830. In many cases, such a cost function may operate to privilege access to memory banks 895 that are physically close to the requesting subsystem. Memory management module 899 may determine, based on the cost function, that in one example, allocating memory from memory bank 895D is optimal for camera subsystem 855.

Continuing with the memory allocation example being described in the context of FIG. 7, memory management module 899 causes host subsystem 853 to output a signal over bus 850. Camera subsystem 855 detects a signal on bus 850 and determines that memory has been allocated for camera subsystem 855 within memory bank 895. Camera subsystem 855 outputs a signal to port 891E that propagates to switch 893B. Switch 893B determines that the signal corresponds to a request to store data within memory bank 895D. Switch 893B determines that it has a direct route to memory bank 895D and that little or no arbitration is required to access memory bank 895D from port 891E. Switch 893B routes data to memory bank 895D via connection 898 and interface 896 between switch 893B and memory bank 895D. Memory bank 895D stores the data within one or more memory cells within memory bank 895D.

Figure 8:
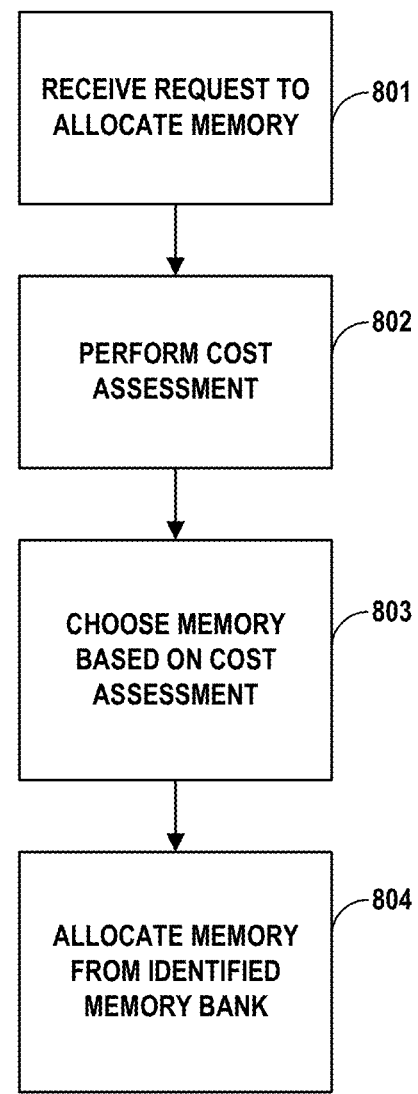
FIG. 8 is a flow diagram illustrating operations performed by an example memory management module executing on a host subsystem in accordance with one or more aspects of the present disclosure.

FIG. 8 is a flow diagram illustrating operations performed by an example memory management module executing on a host subsystem in accordance with one or more aspects of the present disclosure. FIG. 8 is described herein within the context of host subsystem 853 of FIG. 7. In other examples, operations described in FIG. 8 may be performed by one or more other components, modules, systems, or devices. Further, in other examples, operations described in connection with FIG. 8 may be merged, performed in a difference sequence, omitted, or may encompass additional operations not specifically illustrated or described.

In the process illustrated in FIG. 8, and in accordance with one or more aspects of the present disclosure, host subsystem 853 may receive a request to allocate memory (801). For instance, in an example that can be described with reference to FIG. 7, FCV subsystem 856 outputs a signal over bus 850. Host subsystem 853 detects a signal on bus 850 and outputs information about the signal to memory management module 899. Memory management module 899 determines that the signal corresponds to a request, by FCV subsystem 856, to allocate memory.

Host subsystem 853 may perform a cost assessment in order to choose from which memory bank 895 to allocate memory (802). For instance, continuing with the example, memory management module 899 evaluates a cost function that is based on information available to memory management module 899 about SoC 830 and expected data flow patterns of SoC 830. In some examples, such information may include information about availability, current usage, and capacity of each of memory banks 895, expected memory access patterns of FCV subsystem 856, physical distances between components of SoC 830 and FCV subsystem 856, topology of the network within shared memory 890, and power consumption attributes associated with each of memory banks 895.

Host subsystem 853 may choose one of memory banks 895 to allocate based on the cost assessment (803). For instance, based on the cost function, memory management module 899 may determine that memory bank 895H represents the most power efficient and low latency of the available memory banks 895. Memory management module 899 thus chooses to allocate memory from memory bank 895 for FCV subsystem 856.

Host subsystem 853 may allocate memory from the chosen memory bank 895 (804). For instance, memory management module 899 causes host subsystem 853 to output a signal over bus 850. FCV subsystem 856 detects a signal on bus 850. FCV subsystem 856 determines that the signal corresponds to an indication that the request to allocate memory was granted by host subsystem 853. FCV subsystem 856 further determines that the signal identifies memory bank 895H as the memory bank from which memory has been allocated.

Figure 9:
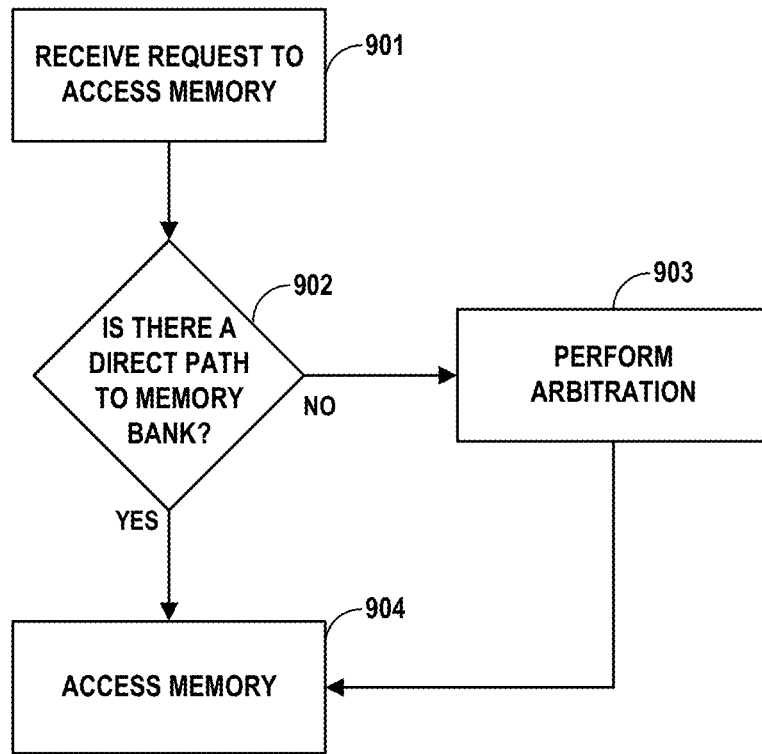
FIG. 9 is a flow diagram illustrating operations performed by one or more example switches or NOCs in accordance with one or more aspects of the present disclosure.

FIG. 9 is a flow diagram illustrating operations performed by one or more example switches or NOCs in accordance with one or more aspects of the present disclosure. FIG. 9 is described herein within the context of NOCs or switches 893 of FIG. 7. In other examples, operations described in FIG. 9 may be performed by one or more other components, modules, systems, or devices. Further, in other examples, operations described in connection with FIG. 9 may be merged, performed in a difference sequence, omitted, or may encompass additional operations not specifically illustrated or described.

In the process illustrated in FIG. 9, and in accordance with one or more aspects of the present disclosure, switch 893B may receive a request to access memory (901). For instance, in another example that can be described with reference to FIG. 7, FCV subsystem 856 outputs a signal to port 891F. Port 891 propagates the signal to switch 893B over connection 892 between port 891F and switch 893B. Switch 893B detects the signal and determines that the signal corresponds to a request to access one of memory banks 895.

Switch 893B may determine whether there is a direct path to the requested memory bank 895 (902). For instance, in one example, switch 893B determines that the signal corresponds to a request to access memory bank 895H. Switch 893B further determines that memory bank 895H can be accessed directly over connection 898 between switch 893B and memory bank 895H (YES path from 902). Switch 893B accesses memory bank 895H and performs a memory operation without, in some cases, performing arbitration (903).

Switch 893A may perform arbitration if there is not a direct path to the requested memory bank 895 (903, and NO path from 902). For instance, in a different example, switch 893B determines that the signal received over connection 892 between port 891F and switch 893B corresponds to a request to access memory bank 895N. Switch 893B further determines that more than one hop (switch 893B and switch 893C) is required to reach memory bank 895N (NO path from 902). Switch 893B and/or switch 893C perform arbitration to avoid contention when accessing memory bank 895H. Switch 893C accesses memory bank 895N (903).

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality VR, an augmented reality AR, a mixed reality MR, a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some examples, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

For ease of illustration, only a limited number of devices (e.g., shared memory devices, SoC devices, subsystems, memory banks 895, switches 893, memory management modules 899, as well as others) are shown within the Figures and/or in other illustrations referenced herein. However, techniques in accordance with one or more aspects of the present disclosure may be performed with many more of such systems, components, devices, modules, and/or other items, and collective references to such systems, components, devices, modules, and/or other items may represent any number of such systems, components, devices, modules, and/or other items.

The Figures included herein each illustrate at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the Figures and/or may include additional devices and/or components not shown in the Figures.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in a number of different ways. For instance, one or more devices illustrated in the Figures herein (e.g., FIG. 6 and/or FIG. 7) as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various Figures herein may alternatively be implemented as part of another device or component not shown in such Figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

Although specific advantages have been identified in connection with descriptions of some examples, various other examples may include some, none, or all of the enumerated advantages. Other advantages, technical or otherwise, may become apparent to one of ordinary skill in the art from the present disclosure. Further, although specific examples have been disclosed herein, aspects of this disclosure may be implemented using any number of techniques, whether currently known or not, and accordingly, the present disclosure is not limited to the examples specifically described and/or illustrated in this disclosure.

What is claimed is:

1. A system that includes an integrated circuit having shared memory and a plurality of subsystems, wherein the system is configured to:
   receive, from a requesting subsystem of the plurality of subsystems, a request to allocate memory from the shared memory, wherein the shared memory includes a plurality of memory banks arranged on the integrated circuit, and wherein the plurality of memory banks include at least one memory bank that can operate in low power mode, and at least one memory bank that cannot operate in low power mode;
   determine which of the plurality of memory banks from which to allocate memory based on an assessment that includes information about expected memory access patterns of the requesting subsystem, and further based on power consumption attributes associated with each of the plurality of memory banks, wherein the power consumption attributes include whether each of the plurality of memory banks can operate in low power mode; and
   allocate memory from one or more of the plurality of memory banks.

2. The system of claim 1, wherein latency attributes associated with each of the plurality of memory banks differ across the plurality of memory banks, and wherein to determine which of the memory banks from which to allocate memory, the system is further configured to:
   perform a cost assessment by evaluating the latency and power consumptions attributes associated with each of the plurality of memory banks.

3. The system of claim 2, wherein the latency attributes associated with each of the plurality of memory banks include:
   whether the integrated circuit is structured to enable the requesting subsystem to access any of the plurality of memory banks with low latency.

4. The system of claim 2, wherein the latency attributes associated with each of the plurality of memory banks include:
   whether the integrated circuit is structured to enable the requesting subsystem to access any of the plurality of memory banks without arbitration.

5. The system of claim 2, wherein to perform the cost assessment, the system is further configured to evaluate at least one of:
   latency to each of the plurality of memory banks by the requesting subsystem;
   power requirements associated with each of the memory banks based on the expected memory access patterns of the requesting subsystem;
   sensitivity of the requesting subsystem to latency;
   expected data flow patterns within the integrated circuit, expected frequency of access for the requesting subsystem;
   whether any of the plurality of memory banks is in a sleep mode; and
   power consumption information associated with bringing any of the memory banks out of the sleep mode.

6. The system of claim 1, wherein to allocate memory from one or more of the plurality of memory banks, the system is further configured to:
   allocate memory from a memory bank that is accessible from the requesting subsystem through a single hop route to the memory bank on the integrated circuit.

7. The system of claim 1, wherein to allocate memory from one or more of the plurality of memory banks, the system is further configured to:
   allocate memory from a memory bank that is physically closest to the requesting subsystem on the integrated circuit.

8. The system of claim 1, wherein to allocate memory from one or more of the plurality of memory banks, the system is further configured to:
   allocate memory from a memory bank that can be accessed through a switch on the integrated circuit without arbitration.

9. An integrated circuit comprising:
   a plurality of shared memory banks including a first bank and a second bank, wherein at least one of the shared memory banks can operate in low power mode and wherein at least one of the shared memory banks cannot operate in low power mode;
   a plurality of subsystems, including a first subsystem and a second subsystem, the first subsystem having access to each of the shared memory banks through a first port, the second subsystem having access to each of the shared memory banks through a second port, wherein latency to the first bank by the first port is lower than latency to the first bank by the second port, and wherein latency to the second bank by the second port is lower than latency to the second bank by the first port;
   a network connecting the first port and the second port to each of the shared memory banks, wherein the network is configured within the integrated circuit to connect the first port to the first bank through a first switch, and connect the second port to the second bank through a second switch; and
   logic for determining, based on power consumption attributes of each of the plurality of shared memory banks, which of the plurality of shared memory banks from which to allocate memory, wherein the power consumption attributes include whether each of the plurality of shared memory banks can operate in low power mode.

10. The integrated circuit of claim 9,
wherein accessing the first bank from first port involves a single hop route to the first bank, and
wherein accessing the second bank from the first port involves a route that includes at least two hops to the second bank.

11. The integrated circuit of claim 9, wherein:
the first switch is positioned physically closer to the first port than the second port on the integrated circuit, and
the second switch is positioned physically closer to the second port than the first port on the integrated circuit.

12. The integrated circuit of claim 9, wherein:
the first switch is positioned physically closer to the first bank than the second bank on the integrated circuit, and
the second switch is positioned physically closer to the second bank than the first bank on the integrated circuit.

13. The integrated circuit of claim 9, wherein the network:
enables concurrent access to the first bank by the first subsystem; and
enables concurrent access to the second bank by the second subsystem.

14. The integrated circuit of claim 9, wherein the network:
enables the first subsystem to access the first bank through the first switch without arbitration, and
enables the second subsystem to access the second bank through the second switch without arbitration.

15. The integrated circuit of claim 9, further comprising a controller configured to:
receive, from the first subsystem, a request to allocate memory;
determine, based on a cost assessment, which of the plurality of shared memory banks from which to allocate memory; and
allocate, by the controller, memory from one or more of the shared memory banks.

16. The integrated circuit of claim 9, wherein the network is configured to:
receive, from the first port, a request to access memory in the first bank of memory; and
enable the first port to access memory in the first bank of memory without arbitration by routing the request through the first switch.

17. The integrated circuit of claim 9, wherein the network is configured to:
connect the first port to the second bank through the first switch and the second switch so that access latency from the first port to the second bank is higher than access latency from the first port to the first bank;
connect the second port to the first bank through the second switch and the first switch so that access latency from the second port to the first bank is higher than access latency from the second port the second bank;
receive, from the first port, a request to access memory in the second bank of memory; and
enable the first port to access memory in the second bank by routing the request through the first switch and the second switch, and performing arbitration to avoid contention with other requests to access the second bank.

18. The integrated circuit of claim 9,
wherein the first switch and the second switch each operates on a different clock domain.

19. A method comprising:
receiving, by processing circuitry on an integrated circuit having shared memory and a plurality of subsystems, and from a requesting subsystem of the plurality of subsystems, a request to allocate memory from the shared memory, wherein the shared memory includes a plurality of memory banks arranged on the integrated circuit, and wherein the plurality of memory banks include at least one memory bank that can operate in low power mode, and at least one memory bank that cannot operate in low power mode;
determining, by the processing circuitry, which of the plurality of memory banks from which to allocate memory based on an assessment that includes information about expected memory access patterns of the requesting subsystem, and further based on power consumption attributes associated with each of the plurality of memory banks, wherein the power consumption attributes include whether each of the plurality of memory banks can operate in low power mode; and
allocating, by the processing circuitry, memory from one or more of the plurality of memory banks.

* * * * *